US010203511B2

(12) United States Patent
Schuck et al.

(10) Patent No.: US 10,203,511 B2
(45) Date of Patent: *Feb. 12, 2019

(54) POLARIZATION CONVERSION SYSTEM AND METHOD FOR PROJECTING POLARIZATION ENCODED IMAGERY

(71) Applicant: RealD Inc., Beverly Hills, CA (US)

(72) Inventors: Miller H. Schuck, Erie, CO (US); Michael G. Robinson, Boulder, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,693

(22) Filed: Jul. 20, 2017

(65) Prior Publication Data

US 2018/0074337 A1 Mar. 15, 2018

Related U.S. Application Data

(63) Continuation of application No. 14/281,727, filed on May 19, 2014, now Pat. No. 9,740,016, which is a (Continued)

(51) Int. Cl.
*G02B 27/26* (2006.01)
*G02B 27/22* (2018.01)
(Continued)

(52) U.S. Cl.
CPC .......... *G02B 27/26* (2013.01); *G02B 26/008* (2013.01); *G02B 27/2264* (2013.01);
(Continued)

(58) Field of Classification Search
CPC .... G02B 27/26; G02B 27/22; G02B 27/2264; H04N 9/3167; H04N 13/0434; H04N 13/337; H04N 13/341
See application file for complete search history.

(56) References Cited

U.S. PATENT DOCUMENTS 2,106,752 A  2/1938  Land
2,403,731 A  7/1946  MacNeille
(Continued)

FOREIGN PATENT DOCUMENTS

BR  2020130172753  4/2013
CN  101021674 A  8/2007
(Continued)

OTHER PUBLICATIONS

International search report and written opinion of international searching authority for corresponding PCT application PCT/US2008/063340, dated Jul. 9, 2008.

(Continued)

*Primary Examiner* — Bao-Luan Le
(74) *Attorney, Agent, or Firm* — Penny L. Lowry; Neil G. Mothew

(57) ABSTRACT

A polarization conversion system separates light from an unpolarized image source into a first state of polarization (SOP) and an orthogonal second SOP, and directs the polarized light on first and second light paths. The SOP of light on only one of the light paths is transformed to an orthogonal state such that both light paths have the same SOP. A polarization modulator temporally modulates the light on the first and second light paths to first and second output states of polarization. First and second projection lenses direct light on the first and second light paths toward a projection screen to from substantially overlapping polarization encoded images. The polarization modulator may be located before or after the projection lenses. The polarization-encoded images may be viewed using eyewear with appropriate polarization filters.

81 Claims, 10 Drawing Sheets

Related U.S. Application Data continuation of application No. 12/118,640, filed on May 9, 2008, now Pat. No. 8,727,536.

(60) Provisional application No. 61/028,476, filed on Feb. 13, 2008, provisional application No. 60/988,929, filed on Nov. 19, 2007, provisional application No. 60/916,970, filed on May 9, 2007.

(51) Int. Cl.
*H04N 9/31* (2006.01)
*H04N 13/337* (2018.01)
*H04N 13/341* (2018.01)
*G02B 26/00* (2006.01)
*G02B 13/00* (2006.01)

(52) U.S. Cl.
CPC ......... *H04N 13/337* (2018.05); *H04N 13/341* (2018.05); *G02B 13/00* (2013.01)

(56) References Cited

U.S. PATENT DOCUMENTS

| | | | |
|---|---|---|---|
| 2,811,077 A | 10/1957 | Franz et al. | |
| 3,208,337 A | 9/1965 | Appledorn | |
| 3,704,997 A | 12/1972 | Smith | |
| 4,427,274 A | 1/1984 | Pund et al. | |
| 4,515,441 A | 5/1985 | Wentz et al. | |
| 4,719,507 A | 1/1988 | Bos | |
| 4,792,850 A | 12/1988 | Lipton | |
| 5,164,854 A | 11/1992 | Takanashi | |
| 5,225,861 A | 7/1993 | Marks | |
| 5,278,680 A | 1/1994 | Karasawa | |
| 5,283,600 A | 2/1994 | Isai | |
| 5,359,455 A | 10/1994 | Oishi | |
| 5,381,278 A | 1/1995 | Shingaki | |
| 5,428,417 A | 6/1995 | Lichtenstein | |
| 5,435,859 A | 7/1995 | Torii | |
| 5,453,859 A | 9/1995 | Sannohe et al. | |
| 5,481,321 A | 1/1996 | Lipton | |
| 5,497,270 A | 3/1996 | Rud | |
| 5,566,367 A | 10/1996 | Mitsutake | |
| 5,691,785 A | 11/1997 | Usui | |
| 5,729,306 A | 3/1998 | Miyake et al. | |
| 5,731,797 A | 3/1998 | Akiyama et al. | |
| 5,772,299 A | 6/1998 | Koo et al. | |
| 5,822,129 A | 10/1998 | Sekine | |
| 5,917,562 A | 6/1999 | Woodgate et al. | |
| 5,917,568 A | 6/1999 | Johnson | |
| 5,982,538 A | 11/1999 | Shikama et al. | |
| 5,993,004 A | 11/1999 | Moseley | |
| 6,067,193 A | 5/2000 | Sekine | |
| 6,094,240 A | 7/2000 | Hiyama et al. | |
| 6,122,103 A | 9/2000 | Perkins et al. | |
| 6,147,802 A | 11/2000 | Itoh et al. | |
| 6,154,320 A | 11/2000 | Itoh | |
| 6,190,013 B1 | 2/2001 | Tani et al. | |
| 6,206,532 B1 | 3/2001 | Hawes | |
| 6,243,199 B1 | 6/2001 | Hansen et al. | |
| 6,252,624 B1 | 6/2001 | Yuasa | |
| 6,280,034 B1 | 8/2001 | Brennesholtz | |
| 6,288,840 B1 | 9/2001 | Perkins | |
| 6,375,327 B2 | 4/2002 | Holman | |
| 6,437,915 B2 | 8/2002 | Moseley et al. | |
| 6,454,416 B2 | 9/2002 | Aoto | |
| 6,508,557 B1 | 1/2003 | Brennesholtz | |
| 6,547,396 B1 | 4/2003 | Svardal | |
| 6,582,080 B2 | 6/2003 | Gibbon et al. | |
| 6,631,992 B2 | 10/2003 | Brennesholtz | |
| 6,636,276 B1 | 10/2003 | Rosenbluth | |
| 6,704,065 B1 | 3/2004 | Sharp et al. | |
| 6,761,459 B1 | 7/2004 | Arsenich | |
| 6,801,263 B2 | 10/2004 | Sato et al. | |
| 6,839,095 B2 | 1/2005 | Bierhuizen | |
| 6,886,943 B1 * | 5/2005 | Greenberg | G03B 21/26 345/1.3 |
| 6,912,074 B1 | 6/2005 | Son et al. | |
| 6,961,045 B2 * | 11/2005 | Tsao | G02B 27/2271 345/103 |
| 6,976,759 B2 | 12/2005 | Magarill | |
| 7,008,070 B2 | 3/2006 | Nishida | |
| 7,059,728 B2 * | 6/2006 | Alasaarela | G03B 21/14 313/512 |
| 7,131,737 B2 | 11/2006 | Silverstein et al. | |
| 7,154,671 B2 | 12/2006 | Sedlmayr | |
| 7,193,765 B2 | 3/2007 | Christensen | |
| 7,198,373 B2 | 4/2007 | Silverstein | |
| 7,204,592 B2 | 4/2007 | O'Donnell | |
| 7,224,411 B2 | 5/2007 | Gibbon et al. | |
| 7,261,453 B2 | 8/2007 | Morejon | |
| 7,270,416 B2 * | 9/2007 | Yamanaka | G02B 27/283 348/E9.027 |
| 7,295,371 B1 | 11/2007 | Sedlmayr | |
| 7,364,303 B2 | 4/2008 | Inoko | |
| 7,387,388 B2 | 6/2008 | Newell | |
| 7,528,906 B2 * | 5/2009 | Robinson | G02B 27/2264 349/5 |
| 7,559,653 B2 | 7/2009 | Silverstein et al. | |
| 7,635,187 B2 | 12/2009 | Sonehara | |
| 7,753,531 B2 | 7/2010 | Fujita | |
| 7,857,455 B2 * | 12/2010 | Cowan | G02B 27/26 353/20 |
| 7,887,193 B2 | 2/2011 | Kanayama | |
| 7,905,602 B2 | 3/2011 | Schuck et al. | |
| 7,959,296 B2 * | 6/2011 | Cowan | G02B 27/26 353/20 |
| 8,134,109 B2 | 3/2012 | Tang | |
| 8,220,934 B2 | 7/2012 | Schuck et al. | |
| 8,632,185 B2 | 1/2014 | Ianchulev | |
| 8,727,536 B2 | 5/2014 | Schuck | |
| 8,833,943 B2 | 9/2014 | Schuck | |
| 2001/0013974 A1 | 8/2001 | Kleinberger | |
| 2003/0128320 A1 | 7/2003 | Mi et al. | |
| 2004/0090601 A1 | 5/2004 | Nakanishi | |
| 2004/0207823 A1 * | 10/2004 | Alasaarela | G03B 21/14 353/122 |
| 2004/0246586 A1 | 12/2004 | Cho | |
| 2004/0263806 A1 | 12/2004 | Silverstein | |
| 2005/0017938 A1 | 1/2005 | O'Donnell | |
| 2005/0030749 A1 | 2/2005 | Nishida | |
| 2005/0157233 A1 | 7/2005 | Wu et al. | |
| 2005/0185139 A1 * | 8/2005 | Yamanaka | G02B 27/283 353/20 |
| 2006/0007537 A1 | 1/2006 | Sedlmayr | |
| 2006/0044516 A1 | 3/2006 | Inoko | |
| 2006/0087734 A1 * | 4/2006 | Weissman | G02B 27/26 359/462 |
| 2006/0092380 A1 | 5/2006 | Salsman | |
| 2006/0215118 A1 | 9/2006 | Sonehara | |
| 2006/0221429 A1 | 10/2006 | Christensen | |
| 2006/0250581 A1 | 11/2006 | Silverstein | |
| 2006/0291053 A1 * | 12/2006 | Robinson | G02B 27/2264 359/465 |
| 2007/0279595 A1 | 12/2007 | Magarill | |
| 2008/0143964 A1 * | 6/2008 | Cowan | G03B 35/18 353/7 |
| 2008/0143965 A1 * | 6/2008 | Cowan | G02B 27/26 353/8 |
| 2008/0225236 A1 | 9/2008 | Schuck et al. | |
| 2009/0128780 A1 | 5/2009 | Schuck | |
| 2010/0141856 A1 | 6/2010 | Schuck et al. | |
| 2010/0328561 A1 | 12/2010 | Schuck | |
| 2011/0096295 A1 | 4/2011 | Cowan | |
| 2011/0205496 A1 | 8/2011 | Schuck | |
| 2012/0057134 A1 | 3/2012 | Huang | |
| 2013/0088688 A1 * | 4/2013 | Read | G02B 27/286 353/8 |
| 2013/0169935 A1 | 7/2013 | Schuck | |
| 2015/0002819 A1 | 1/2015 | Schuck | |

(56) References Cited

U.S. PATENT DOCUMENTS

| | | |
|---|---|---|
| 2015/0109539 A1 | 4/2015 | Li et al. |
| 2016/0041460 A1 | 2/2016 | Schuck |

FOREIGN PATENT DOCUMENTS

| | | |
|---|---|---|
| CN | 101408675 A | 4/2009 |
| CN | 101688940 A | 3/2010 |
| CN | 103383494 A | 11/2013 |
| CN | 203433207 | 2/2014 |
| CN | 103827745 A | 5/2014 |
| DE | 20023883 U1 | 3/2007 |
| DE | 102008043153 A | 4/2010 |
| EP | 0349692 | 10/1990 |
| EP | 1961237 | 6/2007 |
| EP | 2074479 | 4/2008 |
| EP | 2145215 | 11/2008 |
| EP | 2067066 A | 6/2009 |
| EP | 2469336 A | 6/2012 |
| EP | 2732335 A | 5/2014 |
| EP | 2851735 A | 3/2015 |
| GB | 672012 | 5/1952 |
| JP | S62-011823 | 1/1987 |
| JP | S64-013026 A | 1/1989 |
| JP | H04-63305 A | 2/1992 |
| JP | H05-073116 | 3/1993 |
| JP | H05-127120 | 5/1993 |
| JP | H05-203894 A | 8/1993 |
| JP | H05-241103 A | 9/1993 |
| JP | H06-289387 | 10/1994 |
| JP | H06-294933 A | 10/1994 |
| JP | H06-317760 A | 11/1994 |
| JP | H07-056167 A | 3/1995 |
| JP | H07-064075 A | 3/1995 |
| JP | H07-072428 B | 3/1995 |
| JP | H07-146474 A | 6/1995 |
| JP | H07-239473 A | 9/1995 |
| JP | H07-333557 A | 12/1995 |
| JP | 2538127 B | 9/1996 |
| JP | H08-317428 | 11/1996 |
| JP | H09-026555 | 1/1997 |
| JP | H09-026555 A | 1/1997 |
| JP | H09-120047 A | 5/1997 |
| JP | H11-260141 B | 9/1999 |
| JP | 2001-174750 A | 6/2001 |
| JP | 2002-287092 | 10/2002 |
| JP | 2002-287092 A | 10/2002 |
| JP | 2004-138433 A | 5/2004 |
| JP | 2005-512118 | 4/2005 |
| JP | 2005-241870 | 9/2005 |
| JP | 2006-133601 | 5/2006 |
| JP | 2006-227361 A | 8/2006 |
| JP | 2010-506199 A | 2/2010 |
| JP | 2010-507130 A | 3/2010 |
| JP | 2010-072138 A | 4/2010 |
| JP | 2010-122589 A | 6/2010 |
| JP | 2010-164802 A | 7/2010 |
| JP | 2010-528323 A | 8/2010 |
| JP | 2010-276710 A | 12/2010 |
| JP | 2013-003327 A | 1/2013 |
| JP | 2013-020199 A | 1/2013 |
| JP | 2014-052930 A | 3/2014 |
| JP | 2015-072479 A | 4/2015 |
| KR | 10-20090089325 A | 8/2009 |
| KR | 20090094224 B | 9/2009 |
| KR | 20100023858 A | 3/2010 |
| KR | 10-2012-0091414 A | 8/2012 |
| KR | 10-2013-129256 A | 11/2013 |
| KR | 20140054072 A | 5/2014 |
| KR | 20140102775 B | 8/2014 |
| KR | 20150072457 A | 6/2015 |
| KR | 20150104222 A | 9/2015 |
| KR | 101594630 B | 2/2016 |
| SU | 1182471 B | 9/1985 |
| WO | 2000-078056 | 12/2000 |
| WO | 2005-069058 | 7/2005 |
| WO | 2006038744 A1 | 4/2006 |
| WO | WO 2006038744 A1 * | 4/2006 ......... G02B 27/2264 |
| WO | 2007-070245 | 6/2007 |
| WO | 2008-048494 | 4/2008 |
| WO | 2008042798 A | 4/2008 |
| WO | 2013010167 A | 1/2013 |
| WO | 2014-163322 A | 10/2014 |

OTHER PUBLICATIONS

Summary of Office Action dated Feb. 26, 2013, in JP Patent Application No. 20110-507714.

International search report and written opinion of international searching authority for PCT application PCT/US2012/046917, dated Jan. 24, 2013.

Patent Examination Report No. 1 from Australian patent application No. 2008251353, dated Sep. 7, 2012.

Supplementary European Search Report from EP08769432.

Jones, R. Clark, "Ultimate Performance of Polarizers for Visible Light," JOSA vol. 52 No. 7, Jul. 1962.

Pan, Jui-Wen et al., "Homogenized LED-illumination using microlens arrays for a pocket-sized projector", Optics Express, Aug. 20, 2007, vol. 15, No. 17.

Foster, "A Polarizing Vertical Illuminator", Journal Optical Soc. New York, (1938) vol. 28, pp. 124-127.

King et al., "Varifocal Mirror Technique for Video Transmission of Three-Dimensional Images"; Applied Optics,vol. 9, No. 9, (1970).

Muirhead; "Variable Focal Length Mirrors"; Phys. and Meteorology Section, Suffield Experimental station, Ralston, Alberta, Canada; Rev. Sci. Instrum. vol. 32, No. 210 (1961).

Pate; "Polarization Conversion Systems for Digital Projectors", Publ. Apr. 21, 2006.

Robinson et al, "Polarization Engineering for LCD Projection", John Wiley & Sons, (2005).

Shao et al.,"MEMS Three-Dimensional Scan Mirror", Dept of Elec. and Computer Engr., Montana State Univ.—Bozeman, (2004).

Shurcliff, "Polarized Light"; Harvard University Press, (1962).

Stupp et al, "Projection Displays", John Wiley & Sons Ltd. (1999), pp. 143-145.

Yang et al., "Fundamentals of Liquid Crystal Devices"; John Wiley & Sons Ltd. (2006).

Yip et al., "Efficient polarization converter for projection displays", Applied Optics, vol. 36, No. 25, (1997).

Yoder, "Opto-mechanical Systems Design", Optical Engineering, vol. 9, MarcelDekker Inc. (1986).

Kingslake, R.; "Optical System Design"; Academic Press; (1983).

Notice of Reasons for Rejection in Japanese application No. 2009-530647, dated Jul. 2, 2013.

International Preliminary Report on Patentability for PCT/US 07/79958, dated Apr. 9, 2009.

International Search Report and Written Opinion for PCT/US 07/79958, dated Jul. 28, 2008.

International Preliminary Examination Report for PCT/US 07/21823, dated May 14, 2009.

International Search Report and Written Opinion for PCT/US 07/21823, dated Apr. 2, 2008.

Examination Report and Supplemental European Search Report for European application 07852705.8, dated Sep. 4, 2009.

Examination Report for European application 07843526.0, dated Jul. 17, 2012.

Supplemental European Search Report and Examination Reportin European application No. 07843526.0 dated Oct. 4, 2011.

Notice of Reasons for Rejection in Japanese application No. 2009-530647, dated Dec. 4, 2013.

Notification and transmittal of international preliminary report on patentability in corresponding PCT application No. PCT/US08/63340 dated Nov. 10, 2009.

Pastoor et al.,"3-D Displays: A Review of Current Technologies", Display Devices, Dempa Publications,Tokyo, JP, vol. 17, No. 2, pp. 100-110 (1997).

(56) References Cited

OTHER PUBLICATIONS

PTAB PRPS Records for IPR2015-00035 (U.S. Pat. No. 7,857,455). Petition for Inter Partes Review of U.S. Pat. No. 7,857,455 entered Oct. 7, 2014. *Master Image 3D, Inc. and Master Image 30 Asia , LLC*, v. *Reald Inc*. Case No. IPR2015-00035, U.S. Pat. No. 7,857,455 filed Oct. 7, 2014.
Exhibit 1003 "Declaration of Matthew S. Brennescholtz" entered Oct. 7, 2014. *Master Image 3D, Inc. and Masterimage 30 Asia , LLC*, v. *Reald Inc*. Case No. IPR2015-00035, U.S. Pat. No. 7,857,455 filed Oct. 7, 2014.
Preliminary Response to Petition for InterPartes Review of U.S. Pat. No. 7,857,455 entered Feb. 2, 2015. *Master Image 3D, Inc.and Master Image 3D Asia, LLC*, v. *Reald Inc.* Case No. IPR2015-00035, U.S. Pat. No. 7,857,455 filed Oct. 7, 2014.
Decision—Institution of InterPartes Review of U.S. Pat. No. 7,857,455, entered Apr. 23, 2015. *Master Image 3D, Inc. and Master Image 3D Asia, LLC*, v. *Reald Inc.* Case No. IPR2015-00035, U.S. Pat. No. 7,857,455 filed Oct. 7, 2014.
Patent Owner's Response Regarding InterPartes Review of U.S. Pat. No. 7,857,455, entered Jul. 14, 2015. *Master Image 3D, Inc. and Master Image 3D Asia, LLC*, v. *Reald Inc.* Case No. IPR2015-00035, U.S. Pat. No. 7,857,455 filed Oct. 7,2014.
Exhibit 2005, "Declaration of Ying-Moh Liu," Patent Owner's Response Regarding InterPartes Review, entered Jul. 14, 2015. *Master Image 3D, Inc. and Master Image 3D Asia, LLC*,v. *Reald Inc.* Case No. IPR201EH10035, U.S. Pat. No. 7,857,455 filed Oct. 7, 2014.
Exhibit 2006 ,"Declaration of Matt Cowan," Patent Owner's Response Regarding Inter Partes Review of U.S. Pat. No. 7,857,455, entered Jul. 14, 2015. *Master Image 30, Inc.and Master Image 30 Asia ,LLC*,v. *Realo Inc.* case No. IPR2015-00035, U.S. Pat. No. 7,857,455 filed Oct. 7, 2014.
Exhibit 2008, "Declaration of Robert R.McLeod," Patent Owner's Response Regarding Inter Partes Review of U.S. Pat. No. 7,857,455, entered Jul. 14, 2015. *Master Image 3D, Inc. and Master Image 3D Asia,LLC*, v. *Reald Inc.* Case No. IPR2015-00035, U.S. Pat. No. 7,857,455 filed Oct. 7, 2014.
Petitioner Response to Motion for Observation on Cross Examination of Matthew Brennescholtz, entered Nov. 5, 2015. *Master Image 3D, Inc. and Master Image 3D Asia, LLC*, v. *Reald Inc.* Case No. IPR2015-00035, U.S. Pat. No. 7,857,455 filed Oct. 7, 2014.
Exhibit 2190, "Public Transcript of M. Brennescholtz" entered Nov. 11, 2015. *Master Image 3D, Inc. and Master Image 3D Asia, LLC*,v. *Reald Inc.* Case No. IPR2015-00035, U.S. Pat. No. 7,857,455 filed Oct. 7, 2014.
PTAB PRPS Records for IPR2015-00036 (U.S. Pat. No. 7,959,296). Petition for InterPartes Review of U.S. Pat. No. 7,959,296 entered Oct. 7, 2014. *Master Image 3D, Inc. and Master Image 3D Asia, LLC*, v. *Reald Inc.*, Case No. IPR2015-00036, U.S. Pat. No. 7,959,296 filed Oct. 7, 2014.
Preliminary Response to Petition for Inter Partes Review of U.S. Pat. No. 7,959,296 entered Jan. 29, 2015. *Master Image 3D,Inc. and Master Image 3D Asia, LLC*, v. *Reald Inc.*, Case No. IPR2015-00036, U.S. Pat. No. 7,959,296 filed Oct. 7, 2014.
Decision—Denying Institution of InterPartes Review, entered Apr. 22, 2015. *Master Image 3D, Inc. and Master Image 3D Asia, LLC* v. *Reald Inc.*, Case No. IPR2015-00036, U.S. Pat. No. 7,959,296 filed Oct. 7, 2014.
Extended European search report for European application 07843526.0, dated Nov. 3, 2011.
Notice of Preliminary Rejection in co-pending Korean patent application No. 10-2016-7013674, dated Aug. 17, 2016.
Notice of Preliminary Rejection in co-pending Korean patent application No. 10-2014-7021821, dated May 19, 2016.
PTAB Final Written Decision, dated Apr. 14, 2016. *Masterimage 3D, Inc and Masterimage 3D Asia, LLC* v. *Reald Inc.* Case No. IPR2015-00040, U.S. Pat. No. 8,220,934 filed Oct. 7, 2014.
USPTO Inter Partes Review of U.S. Pat. No. 7,857,455, IPR2015-00033 (not instituted).
USPTO Inter Partes Review of U.S. Pat. No. 7,857,455, IPR2015-00035 (final written decision entered).
USPTO Inter Partes Review of U.S. Pat. No. 7,857,455, IPR2015-00876 (not instituted).
USPTO Inter Partes Review of U.S. Pat. No. 7,905,602, IPR2015-00038 (not instituted).
USPTO Inter Partes Review of U.S. Pat. No. 8,220,934, IPR2015-00040 (final written decision entered).
USPTO Inter Partes Review of U.S. Pat. No. 8,220,934, IPR2015-00877 (not instituted).
Respondents' Notice of Prior Art (4) Redacted, Apr. 24, 2015.
Supplemental Statement of Opposition to European patent No. EP2469336B1, filed by Volfoni Sas (Jun. 13, 2018).

\* cited by examiner

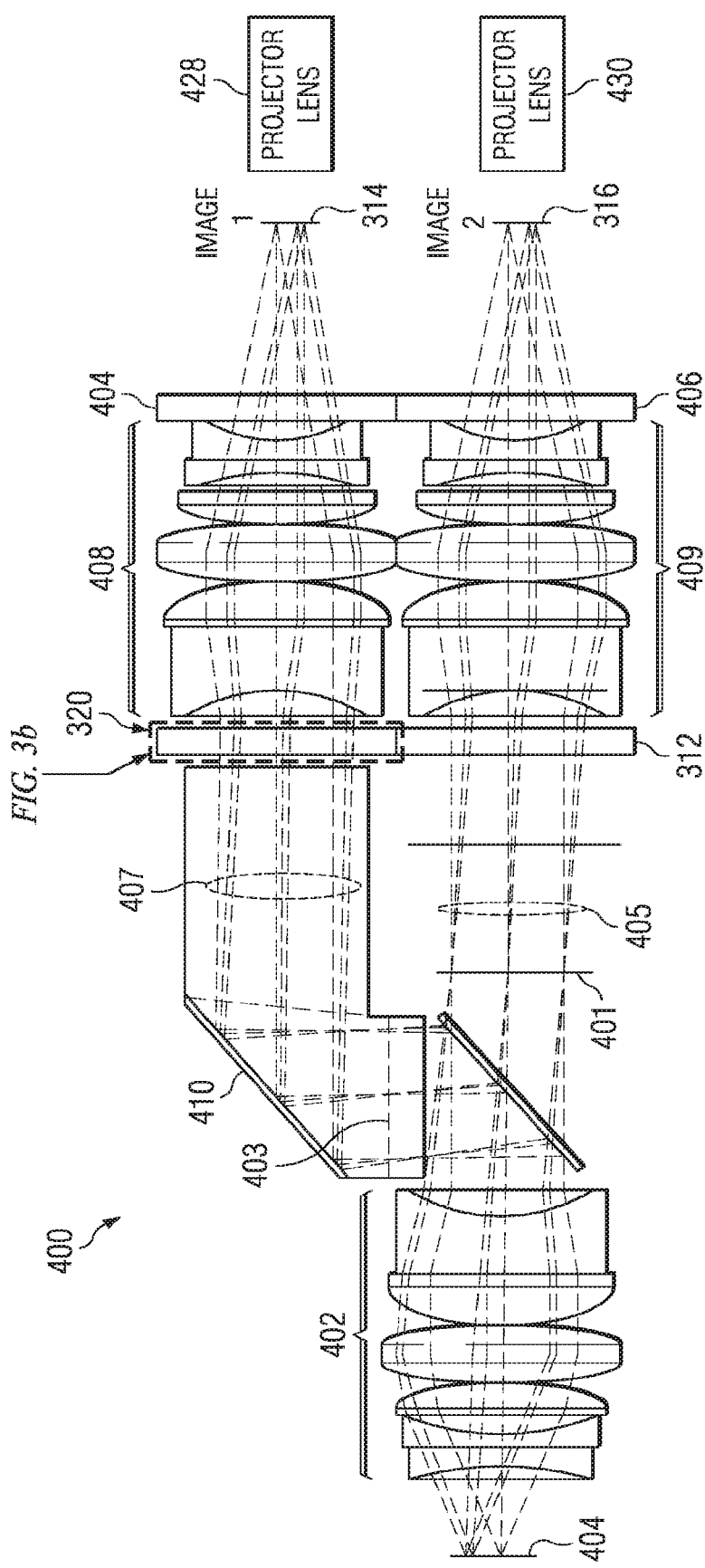

POLARIZATION CONVERSION SYSTEM AND METHOD FOR PROJECTING POLARIZATION ENCODED IMAGERY

CROSS-REFERENCE TO RELATED APPLICATIONS

This patent application relates and claims priority to provisional patent application 60/916,970, entitled "Polarization conversion system for 3-D projection," filed May 9, 2007; this patent application also relates and claims priority to provisional patent application 60/988,929, entitled "Polarization conversion system for 3-D projection," filed Nov. 19, 2007; and this patent application further relates and claims priority to provisional patent application 61/028,476, entitled "Polarization conversion system for stereoscopic projection," filed Feb. 13, 2008, all of which are herein incorporated by reference for all purposes.

BACKGROUND

Technical Field

The disclosed embodiments relate generally to projection of polarization-encoded images and, more specifically, to a polarization conversion system and method for transmitting polarization-encoded imagery to a projection screen.

Background

FIG. 1 is a schematic diagram illustrating an exemplary polarization-preserving display system 100. The display system 100 includes a projection screen 102 and polarization filtering eyewear 104. Stereoscopic three-dimensional (3D) imagery is observed using a single polarization-preserving screen 102 sequentially displaying left and right perspective imagery, with polarization filtering eyewear 104. The polarization filtering eyewear 104 contains two lenses 106 and 108 of alternately orthogonal polarization.

3D imagery can be synthesized using polarization control at the projector to encode, and polarization filtering eyewear to decode the left and right perspective imagery (See, e.g., commonly-owned U.S. Pat. No. 4,792,850, entitled "Method and system employing a push-pull liquid crystal modulator," to Lenny Lipton et al. and U.S. patent application Ser. No. 11/424,087 entitled "Achromatic Polarization Switches," filed Jun. 14, 2006, both of which are herein incorporated by reference in their entirety for all purposes).

A conventional implementation of polarization control after the projection lens is shown in FIG. 2. Nearly-parallel rays emerge from the output of the lens, appearing to originate from a pupil inside of the lens, and converge to form spots on a distant screen. Ray bundles A, B, and C in FIG. 2 are bundles forming spots at the bottom, center, and top of a projection screen. The light emerging from the projection lens is randomly polarized, depicted in FIG. 2 as both S-and P-polarized light. The light passes through a linear polarizer, resulting in a single polarization state after the polarizer. The orthogonal polarization state is absorbed (or reflected), and the light flux after the polarizer is less than 50% of the original flux (resulting in a dimmer final image). The polarization switch is synchronized with the image frame, and the polarization state emerging from the polarization switch is alternated, producing images of alternately orthogonal polarization at the screen. Polarization selective eyewear 104 allows images of one polarization to pass to the left eye, and image of the orthogonal polarization to pass to the right eye. By presenting different images to each eye, 3D imagery can be synthesized.

This system is currently in use in movie theatres. However, typically, this system design suffers from having more than 50% of the light absorbed by the polarizer, and thus the resulting image is typically more than 50% dimmer than that of a typical 2D theatre. Moreover, time-sequential stereoscopic 3D further reduces the brightness by more than 50%. The dimmer image can therefore limit the size of the theatre used for 3D applications and/or provides a less desirable viewing experience for the audience.

SUMMARY

The present disclosure addresses the aforementioned issues as well as others to provide a polarization conversion system and method for stereoscopic projection. Generally, a polarization conversion system separates light from an unpolarized image source into a first state of polarization (SOP) and an orthogonal second SOP, and directs the polarized light on first and second light paths. The SOP of light on only one of the light paths is transformed to an orthogonal state such that both light paths have the same SOP. A polarization modulator temporally modulates the light on the first and second light paths to first and second output states of polarization. First and second projection lenses direct light on the first and second light paths toward a projection screen to form substantially overlapping polarization encoded images, much brighter than the referenced prior art system. The polarization-encoded images may be viewed using eyewear with appropriate polarization filters.

According to an aspect, a polarization conversion system for transmitting polarization encoded imagery to a projection screen includes a first projection lens, a second projection lens, a polarization splitter (PBS), a reflecting element, and a polarization modulator. The PBS is operable to transmit light of a first polarization state toward the first projection lens on a first light path, and is further operable to reflect light of a second polarization state toward a second light path. The reflecting element is located on the second light path and is operable to reflect light toward the second projection lens. The polarization modulator may be located on the first and second light paths. The first and second projection lenses are operable to direct the polarization encoded images toward the projection screen.

In some embodiments, the polarization modulator may be a single unit that is located on both the first and second light paths. In other embodiments, the polarization modulator may include a first polarization switch and a second polarization switch, each polarization switch being located on respective first and second light paths. The polarization switch(es) may be located before or after the projection lenses.

According to another aspect, a method for projecting polarization-encoded stereoscopic image includes receiving unpolarized image source light at a polarization beam splitter. The method includes transmitting image source light of a first polarization state at the polarization beam splitter toward a projection lens located on a first light path. The method also includes reflecting image light of a second polarization state at the polarization beam splitter toward a second light path. The method further includes reflecting light on the second light path toward a projection lens. The method additionally includes rotating the state of polarization of light on one of the first and second light paths light to an orthogonal state of polarization. The method further includes temporally modulating the state of polarization of the light on the first and second light paths between a first polarized output state and a second polarized output state.

Other features will be apparent with reference to the foregoing specification.

BRIEF DESCRIPTION OF THE DRAWINGS

Embodiments are illustrated by way of example in the accompanying figures, in which like reference numbers indicate similar parts, and in which:

FIG. 4 is a schematic diagram illustrating a second embodiment of a PCS, in accordance with the present disclosure;

DETAILED DESCRIPTION

Figures 3, 3B:
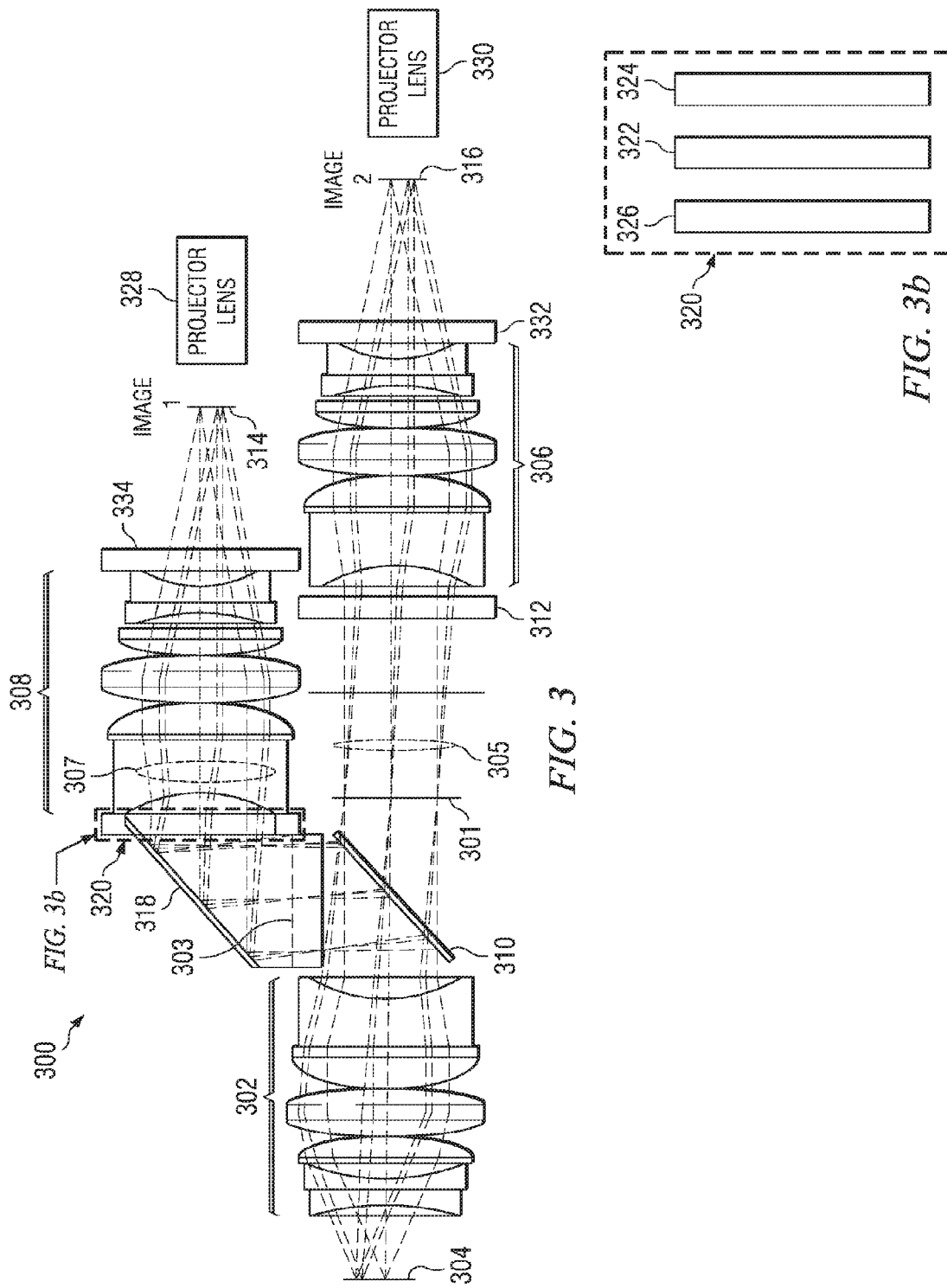
FIG. 3 is a schematic diagram illustrating a first embodiment of a polarization conversion system (PCS), in accordance with the present disclosure.
FIG. 3B is a schematic diagram illustrating a polarization converting and switching module, in accordance with the present disclosure.

First Embodiment:

FIG. 3 is a schematic diagram illustrating a first embodiment of a polarization conversion system (PCS) 300. Generally, PCS 300 may include an image source 304 (e.g., from a light modulating panel or conventional film), initial relay lens 302, polarizing beam splitter (PBS) 310, first and second relay lenses 306, 308, polarization switch 312, fold mirror 318, polarization converting and switching module 320, and first and second projection lenses 328, 330, arranged as shown. As illustrated by FIG. 3B, polarization converting and switching module 320 may include polarization converter 322 and polarization switch 324, and may optionally include a pre-polarizer 326 to improve contrast, all arranged as shown. Polarization converter 322 is an optical component that is operable to transform an input state of polarization to an orthogonal state of polarization (e.g., a half wave plate).

The first and second relay lenses 306 and 308 are preferably symmetric about respective aperture stops 301, 303, respectively located after the polarization switch 312 and polarization converting and switching module 320, providing substantially distortion-less images of the panel 304 at each image location 314 and 316. In an alternative embodiment, the aperture stops 301, 303, may be located on the respective light paths 305, 307, immediately prior to the polarization switch 312 and polarization converting and switching module 320. In another alternative embodiment, FIG. 3 depicts an alternate location 332 for the polarization switch 312 in the first light path 306, and an alternate location 334 for the polarization converting and switching module 320 in the second light path 308. These locations may prove to be beneficial alternatives if birefringence through the ions elements 302 of the relay system 300 degrades the system contrast. As another alternative location, the polarization switches 312, 324 may instead be placed after the projection lens rather than prior to it. Such an embodiment may provide system contrast advantages. Note that it is not necessary that the half wave plate 322 is immediately adjacent the polarization switch 324—the half wave plate 322 may be located anywhere in the light path between the PBS 310 and the polarization switch 324. Indeed, in alternative embodiments, the positions of the polarization switch 312 and the polarization converting and switching module 320 may be reversed such that the polarization switch 312 is located on the second light path 307 and the polarization converting and switching module 320 is located on the first light path 305.

In operation, panel 304 (e.g., a Digital Light Processing (DLP) panel from Texas Instruments or conventional film) is illuminated with randomly polarized light from a light source (not shown) to provide unpolarized image source light. The light source may be, for example, a conventional UHP lamp, a xenon lamp, a light emitting diode light source, or in some embodiments, a light source taught in commonly-owned U.S. patent application Ser. No. 11/779,708, entitled "Light collector for projection systems," filed Jul. 18, 2007, herein incorporated by reference. The unpolarized image source light from the panel 304 is directed toward PBS 310 by initial relay lens 302. The PBS 310 may transmit P-polarized light on a first light path 305, and reflect S-polarized light toward a second light path 307. On the first light path 305, the P-polarized light passes through the polarization switch 312, which operates to rotate the light passing through the switch 312 in alternating frames, similar to the bundles A, B, and C in FIG. 2.

On the second light path 307, the S-polarized light reflected by the PBS 310 passes to a fold mirror 318 (or any optical component that serves to reflect light without changing the polarization state, e.g., a prism). The S-polarized light then passes through a polarization converting and switching module 320. The polarization converter 322 (which may be a half wave plate) preferably transforms substantially all visible wavelengths to the orthogonal polarization (in this case, from S- to P-polarized light). The now-P-polarized light then passes through polarization switch 324. In some embodiments, a pre-polarizer 326 may be added before or after module 320 for higher contrast. The polarization switch 324 included in the polarization and switching module 320 operates to create alternating orthogonal states in a manner substantially identical to the switch 312 in the first light path 305.

The polarization conversion system 300 may form two separate images 314 and 316 of the panel 304, each with magnification 1× (i.e., the output images at 314 and 316 may be substantially the same size as the input image from panel 304). It should be appreciated that the magnification could be other than 1× in this and other embodiments and that this magnification is provided as an example. First and second projection lenses 328 and 330 respectively image the intermediate images 314 and 316 onto the projection screen 102. The projection lenses 328 and 330 are allowed to move laterally, such that the images on the screen 102 from the two optical paths 305 and 307 are superimposed, substantially overlapping, preferably with minimal keystone distortion. Since nearly all of the randomly polarized light from the panel 304 is imaged at the screen 102 with a single polarization state, the resulting image of the system in FIG. 3 is approximately two times brighter than the image at the screen 102 for the system in FIG. 2.

This system may also be applied to cinematic, professional and consumer applications such as home theatre and rear projection television (RPTV), assuming polarization-preserving screens 102 are utilized.

Second Embodiment:

FIG. 4 is a schematic diagram illustrating a second embodiment of a polarization conversion system (PCS) 400. PCS 400 provides a similar relay system to that shown in FIG. 3, with an arrangement of components having substantially similar structure and function, except a glass prism 410 has been inserted into the second light path 407, arranged as shown. Glass prism 410 may be a high index glass prism.

In operation, the glass prism 410 allows the two images 414 and 416 of the panel 404 to be collocated substantially in a single plane, providing more convenient packaging and adjustment of the projection lenses 428 and 430. It is preferable that the relay system 400 is designed such that rays from a single field point at the object (i.e., panel 404) produce a collimated bundle (all rays from a field point having the same angle) at the aperture stops 401 and 403. This allows the insertion of the glass prism 410 at the aperture stop without affecting the lens 402 performance. The glass prism 410 allows the two images 414 and 46 to be collocated. Again, in alternate embodiments, the polarization converting and switching module 420 and polarization switch 412 may each have alternate locations 404 and 406 respectfully for each path, either before the projection lens or after the projection lens.

Figure 5:
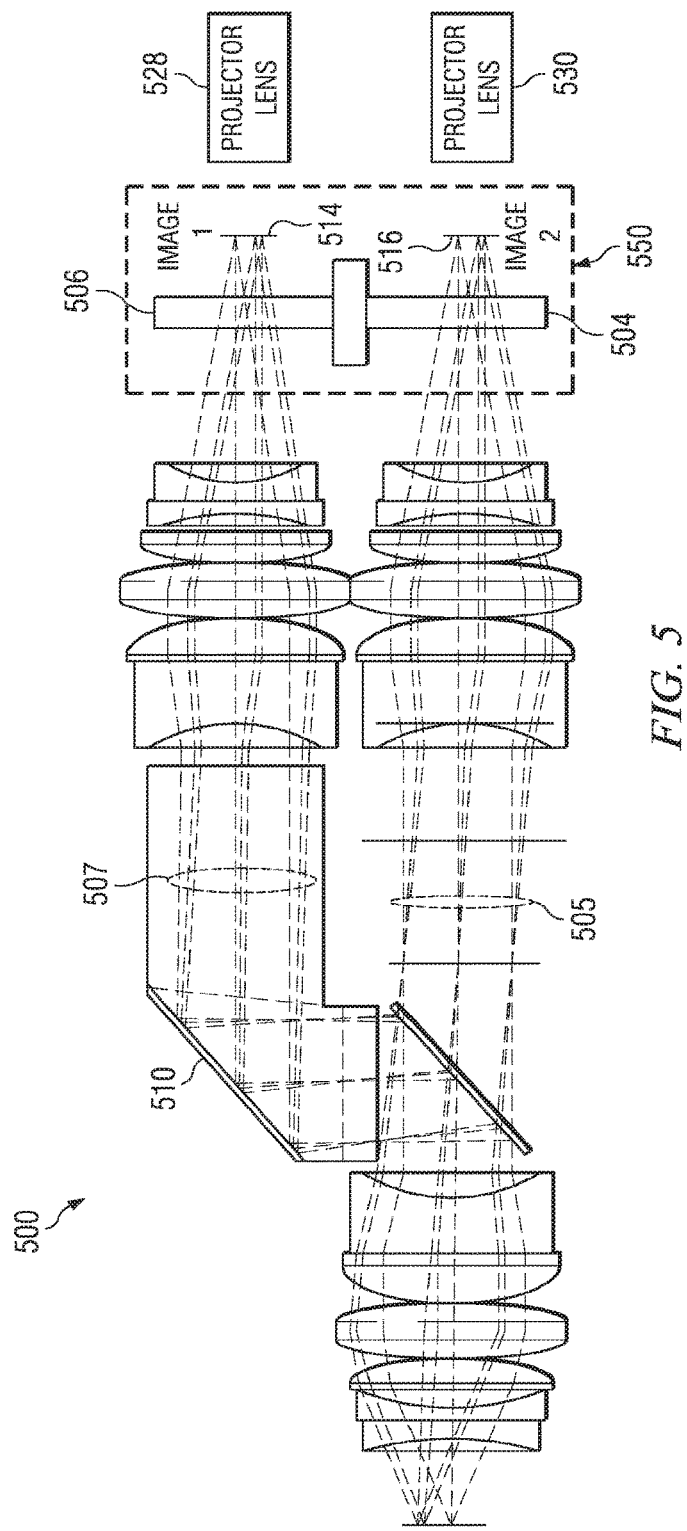
FIG. 5 is a schematic diagram illustrating a third embodiment of a PCS, in accordance with the present disclosure.

Third Embodiment:

FIG. 5 is a schematic diagram illustrating a third embodiment of a polarization conversion system (PCS) 500. FIG. 5 provides a similar PCS 500 to that shown in FIG. 4, except the polarization switch 412 of FIG. 4 has been replaced by a spinning wheel 550 operable to convert the polarized input to a set of temporally alternating orthogonally polarized output states. In one embodiment, the spinning wheel 550 may contain segments that transmit alternating orthogonal polarization from a non-polarized input. In another embodiment, the spinning wheel 550 may be preceded by a fixed polarizer. The spinning wheel 550 may then contain segments that represent unitary polarization transformations (e.g. from a stack of retardation films).

An issue resulting from physical rotation of a polarizer (spinning wheel 550) is that the output varies in an analog fashion, unless each segment is patterned to compensate for this effect. Functionally, a binary polarization switching effect is desired, which according to this disclosure is optimally accomplished using elements with circular Eigenpolarizations. For instance, a true circular polarizer (versus, for example, a linear polarizer followed by a retarder, or retarder stack) will transmit a particular handedness (e.g., right or left) of circular state, regardless of wheel orientation.

Alternatively, a fixed polarizer can be followed by a unitary polarization transforming element with circular Eigenpolarizations, or a pure circular retarder. For instance, a linear polarizer can be followed by a rotating wheel 550 that contains a combination of isotropic segments, as well as pure achromatic polarization rotating elements. A pure achromatic rotator has zero linear retardation (no optic axis), but has a desired amount of phase delay between orthogonal circular states. In this case, a π phase shift between circular Eigenstates will convert the input to the orthogonal linear output, regardless of wheel orientation. Thus, an analog wheel will provide binary switching between orthogonal linear polarizations.

Pure achromatic polarization rotators may be fabricated using stacks of linear retarders. One design method is to pair stacks with a particular symmetry arrangement. For instance, a stack that produces a particular retardation and rotation can be paired with an identical stack with reverse-order, or reverse-order reflected symmetry (See, e.g., Chapter 5 of Robinson et. al., POLARIZATION ENGINEERfor LCD PROJECTION, Wiley & Sons 2005, which is hereby incorporated by reference). A reverse order stack doubles the net retardation while eliminating rotation, while the addition of reflection has the effect of doubling rotation while eliminating retardation. A stack designed to convert a 0-oriented linear input to a π/4 oriented linear output (at all wavelengths of interest) can be designed, which in general contains linear retardation. However, when paired with the reverse-order-reflected stack, the net effect is zero retardation and the desired π/2 orientation transformation. Such transparent elements can be laminated as segments on an isotropic disk to produce binary polarization switching with spinning wheel 550.

Table 1 provides a design for an exemplary retarder stack exhibiting substantially achromatic rotation of π/2 having reverse-order-reflected symmetry. Note that this symmetry is a sufficient, but not necessary condition for achieving the desired polarization transformation. It is easily verified that the state of polarization after layer-6 is 45° linear, though the stack possesses linear retardation that is eliminated by the subsequent stack. In this example, all layers have a zero-order in-plane retardation of ½-wave (typically 240-270 nm to span the visible). It should be apparent that, in accordance with the present disclosure, other retarder combination designs may be employed that have different orientations and retardation profiles.

TABLE 1

| Layer Number | Orientation |
| --- | --- |
| 1 | −19.6° |
| 2 | 2.4° |
| 3 | 18.1° |
| 4 | −65.6° |
| 5 | −54.3° |
| 6 | −15.0° |
| 7 | 15.0° |
| 8 | 54.3° |
| 9 | 65.6° |
| 10 | −18.1° |
| 11 | −2.4° |
| 12 | 19.6° |

Still referring to FIG. 5, in operation, light from the lower light path 505 is P-polarized and passes through the isotropic segment 504 of the wheel 550. The light remains P-polarized through Image 2 516, through the projection lens 530, and onto the screen 102. In this instance, light in the upper path 507 is S-polarized and passes through the rotator segment 506 of the wheel 550. The S-polarized light is rotated to P-polarized light by the wheel 550, and passes through the projection lens 528 and onto the screen 102 as P-polarized light. The wheel 550 is then synchronized with the video frames to produce images on a screen 102 with alternating polarization. Variations of the polarization states are also possible, with each path producing circular polarization by addition of quarter-wave plates in the optical, paths, or rotated linear polarization states (e.g., +/−45 degrees) by addition of rotators in each path.

Figure 6:
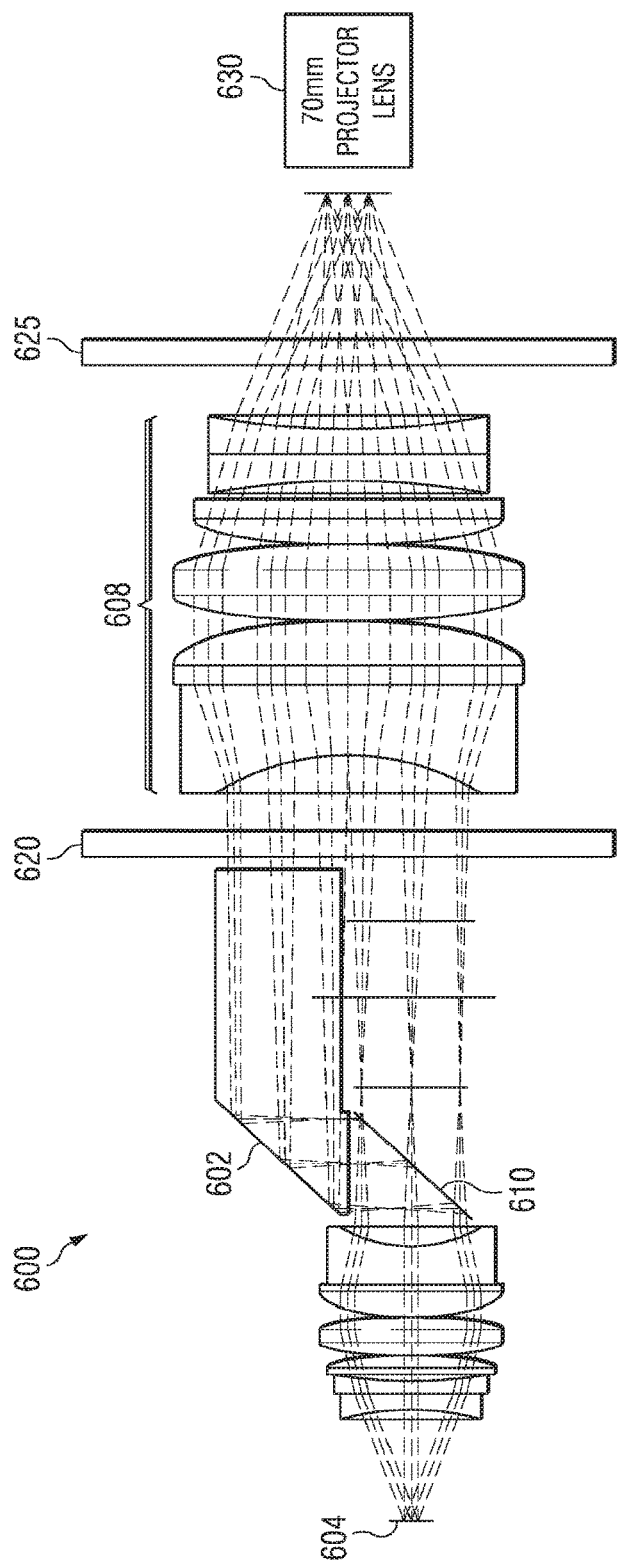
FIG. 6 is a schematic diagram illustrating a fourth embodiment of a PCS, in accordance with the present disclosure.

Fourth Embodiment:

FIG. 6 is a schematic diagram illustrating a fourth embodiment of a polarization conversion system (PCS) 600. FIG. 6 illustrates a PCS 600 where the magnification has been increase to 2× (versus 1× previously). In this case, the first half of the PCS 600, including PBS 610 and path-matching glass prism 602 may be identical in structure and function to the components described in FIG. 4. However, the second half of the PCS 600 has been scaled by 2 to increase the focal length of the second half by 2. The PCS 600 produces an image that is twice the size of the panel 604, yet maintains the same f-number (or numerical aperture). In this exemplary embodiment, a single relay lens 608 may be used to provide an intermediate image, and a single projection lens 630 (e.g., a 70 mm cinema lens) may be utilized to image the intermediate image to the screen 102. The polarization converting and switching module 620 and its alternate location 625 are also shown.

Figure 7:
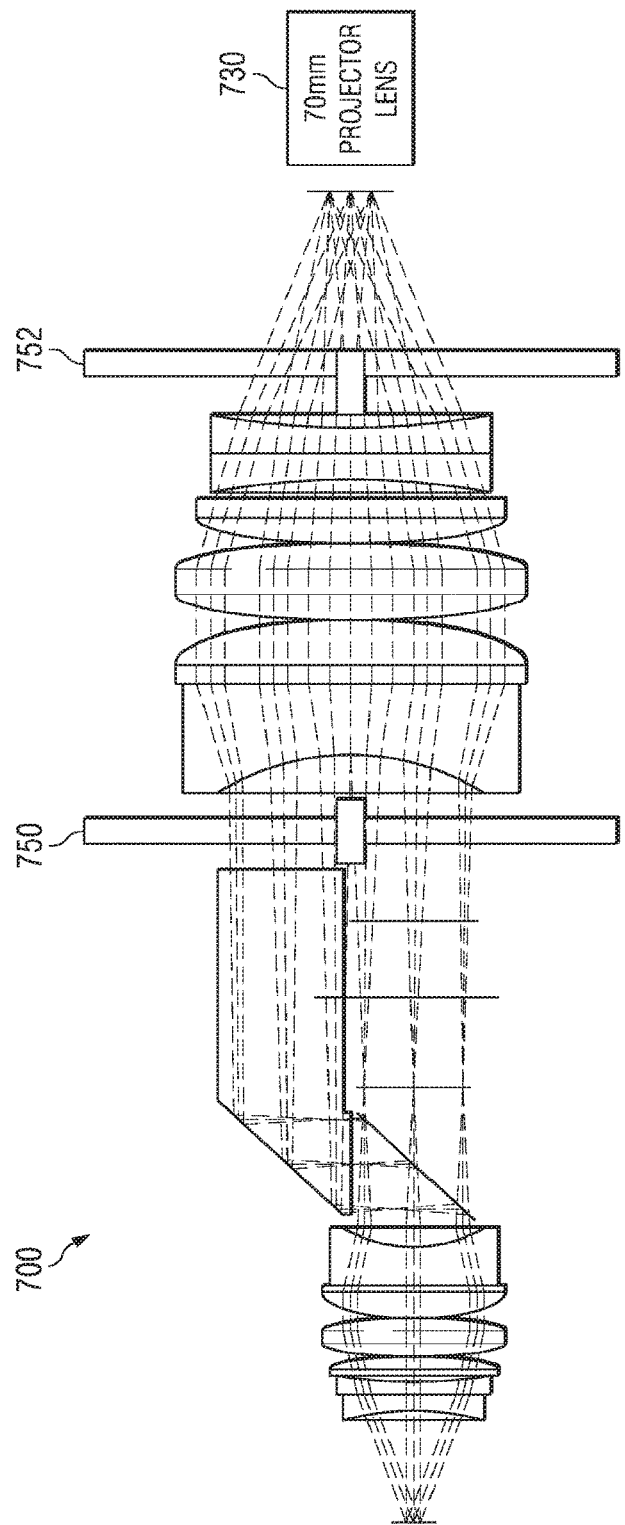
FIG. 7 is a schematic diagram illustrating a fifth embodiment of a PCS, in accordance with the present disclosure.

Fifth Embodiment:

FIG. 7 is a schematic diagram illustrating a fifth embodiment of a PSC 700. FIG. 7 depicts a similar PCS 700 to that shown in FIG. 6, except the polarization converting and switching modules 620 of FIG. 6 have been replaced by the segmented wheel 730 (similar to the segmented wheel 550 described in FIG. 5). The segmented wheel 750 and an alternate segment wheel location 752 are also indicated. Once again, a single projection lens 730 can be utilized to image the intermediate image to the screen 102.

Figure 8:
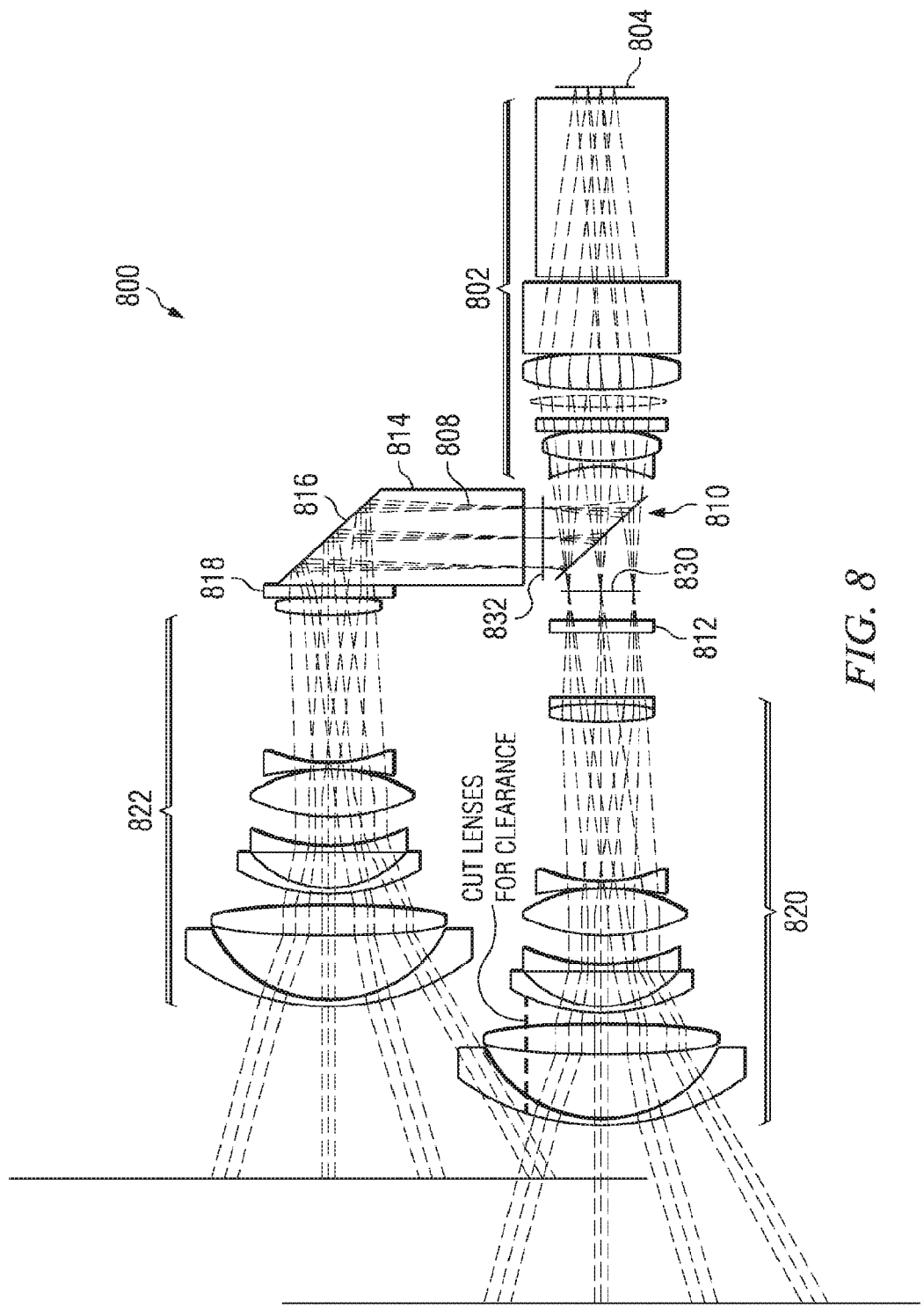
FIG. 8 is a schematic diagram illustrating a sixth embodiment of a PCS, in accordance with the present disclosure.

Sixth Embodiment:

FIG. 8 is a schematic diagram illustrating a sixth embodiment of a PCS 800. The PCS 800 may include a panel 804, an initial relay lens 802, a PBS 810, a polarization switch 812 on a first light path, a glass prism 814 with a reflector (e.g., a mirrored angled surface) 816, a polarization converting and switching module 818, and first and second projection lenses 820 and 822, all arranged as shown. Polarization converting and switching module 818 may have an optional pre-polarizer, a polarization rotator and a polarization switch, similar to the description of the polarization converting and switching module 320 of FIG. 3B. The projection lens system 800 may form two separate images of the panel 304, each with large magnification. This PCS 800 may also be applied to professional and consumer applications such as home theatre and RPTV, assuming polarization-preserving screens 102 are available.

In operation, panel 804 (such as a Digital Light Processing, or DLP, panel from Texas Instruments) is illuminated with randomly polarized light. In this embodiment, light from the panel 804 is projected so a screen 102 by first and second projection lenses 820 and 822, which may be of the reverse telephoto type. The PBS 810 transmits P-polarized light along a first light path, and reflects S-polarized light along a second light path. The P-polarized light passes through the polarization switch 812 and is rotated by the polarization switch 812 in alternating frames, similar to bundles A, B, and C in FIG. 2.

The S-polarized light reflected by the PBS 810 (on the second light path) passes to a prism 814. The prism 814 may contain an angled surface 816 that serves as a fold mirror. Reflection may be accomplished with total internal reflection, or by coating the hypotenuse with a mirror layer (e.g., silver). In order to insert such a prism 814 internal to the PCS 800 without creating excessive aberrations in the final image, it is preferable that rays from a field point at the object (panel 304) are collimated (i.e., the rays in the bundle have the same angle) at the aperture stop(s) 830 and 832. In some embodiments, the aperture stop 830 may be located along the first light path before the polarization switch 812, and/or along the second light path at some location (i.e., 832) before the prism structure 814. Thus, collimated rays pass through the prism structure 814 without the introduction of aberrations. The S-polarized light then passes out of the prism 814, through polarization converting and switching module 818, and is rotated to P-polarized light. The polarization switch within polarization converting and switching module 818 acts on P-polarized light, rotating the polarization of the ray bundles in alternating frames, in synchronization with the rotation of bundle sin the non-mirror path.

Two substantially identical second halves of the lenses 820 and 822 project the two images onto the screen 102. To overlap the two images on the screen 102, the polarizing beam splitter 810 tilt may be adjusted and/or the prism 808 tilt may be adjusted. The projection lens assembly, may as a whole, be allowed to move laterally, such that the images on the screen 102 from the first and second optical paths can be offset vertically for various theatre configuration. The first half lenses 820 may be cut in the lower path to allow for light to pass clearly in the upper path, as is depicted in FIG. 8.

Figure 1:
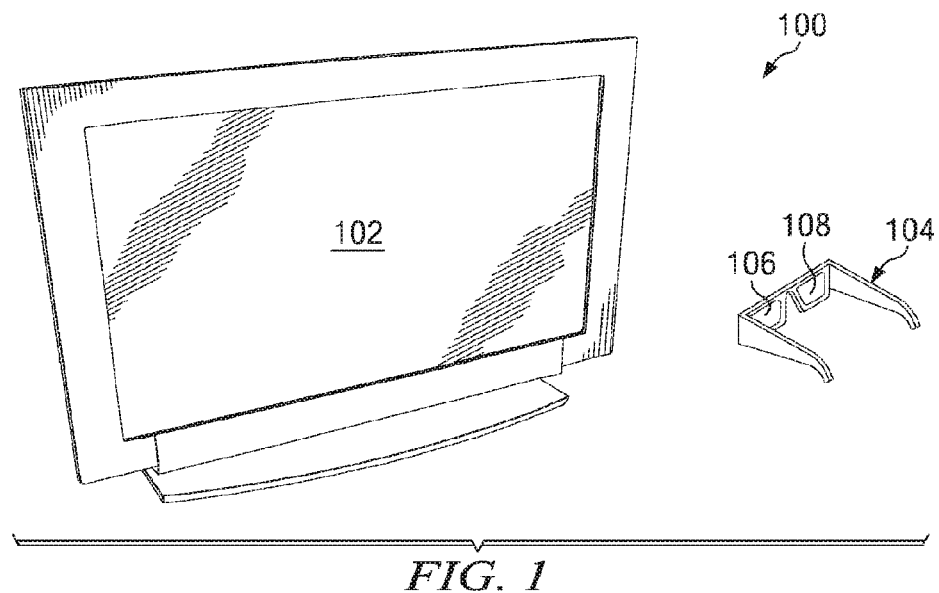
FIG. 1 is a schematic diagram illustrating an exemplary polarization-preserving display system, in accordance with the present disclosure.
Figure 2:
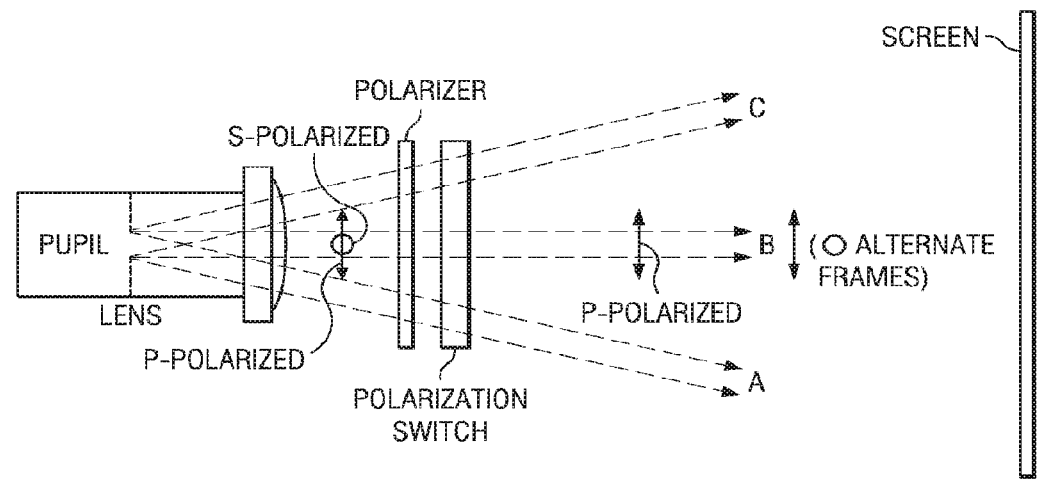
FIG. 2 illustrates a known implementation of polarization control in a cinematic 3D system utilizing a polarization switch.

Since nearly all of the randomly polarized light from the panel 804 is imaged at the screen 102 with a single polarization state, the resulting image of the system in FIG. 8 is approximately two times brighter than the image at the screen 102 for the system in FIG. 2.

Figure 9:
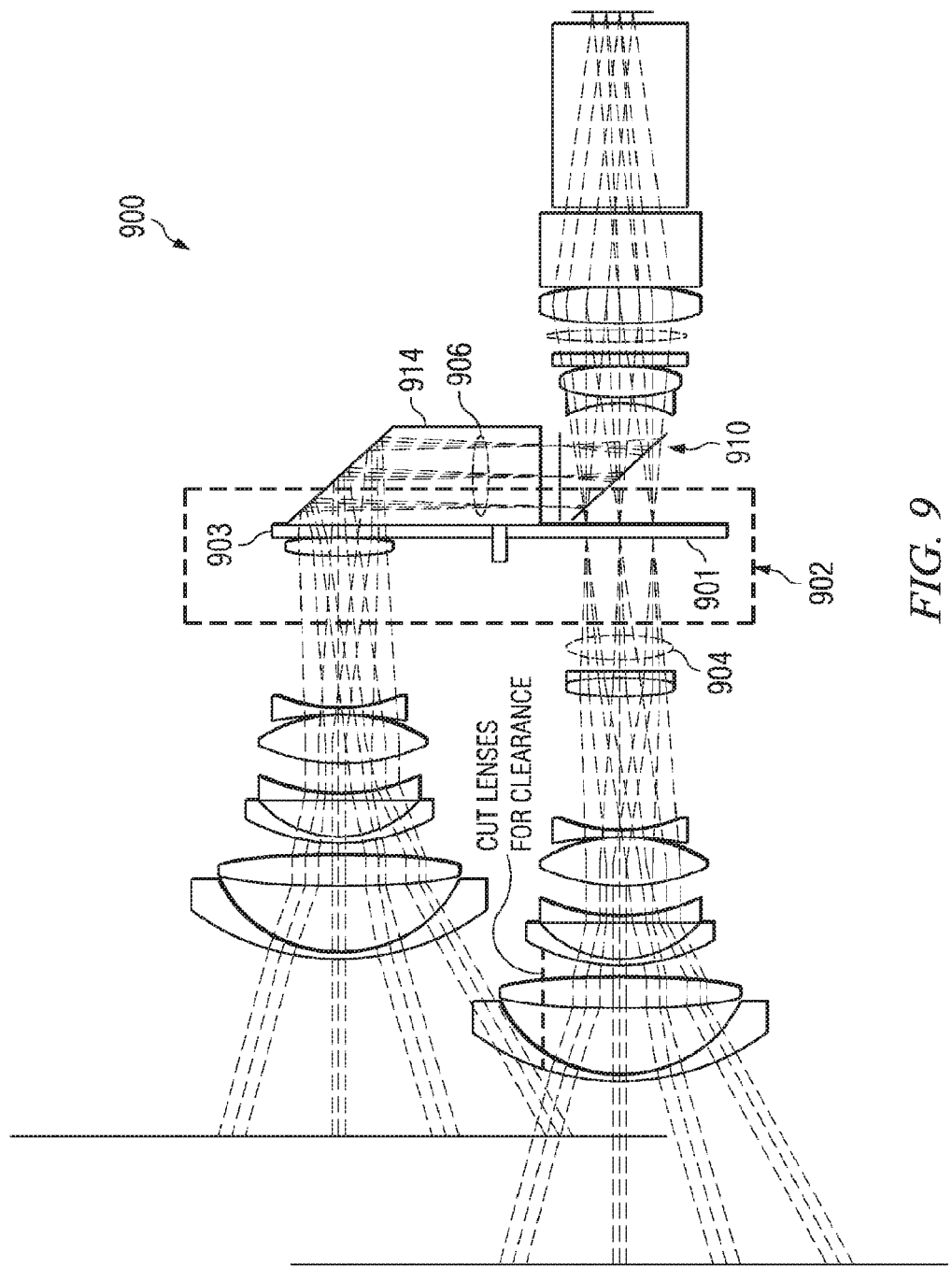
FIG. 9 is a schematic diagram illustrating a seventh embodiment of a PCS, in accordance with the present disclosure.

Seventh Embodiment:

FIG. 9 depicts a similar polarization conversion system 900 as in FIG. 8, except that the polarization switch 812 has been replaced by a spinning wheel 902. The wheel 902 is segmented into two of more regions as described previously. In this instance, light from the lower path 904 is P-polarized and passes through the (e.g.) isotropic segment 901 of the wheel 902. The light remains P-polarized through the rest of the projection lens system 900, and onto the screen 102. In this instance, light in the upper path 906 is S-polarized and passes through the (e.g.) rotator segment 903 of the wheel 902. The S-polarized light is rotated to P-polarized light by the wheel 902, and passes through the rest of the projection system 900 and onto the screen 102 as P-polarized light. The wheel 902 is then synchronized with the video frames to produce images on screen 102 with alternating polarization variations of the polarization states are also possible, with each path 904 and 906 producing circular polarization by addition of quarter wave plates (not shown) in the optical paths, or rotated linear polarization states (e.g., +/−45 degrees) by addition of rotators in each path.

Figure 10:
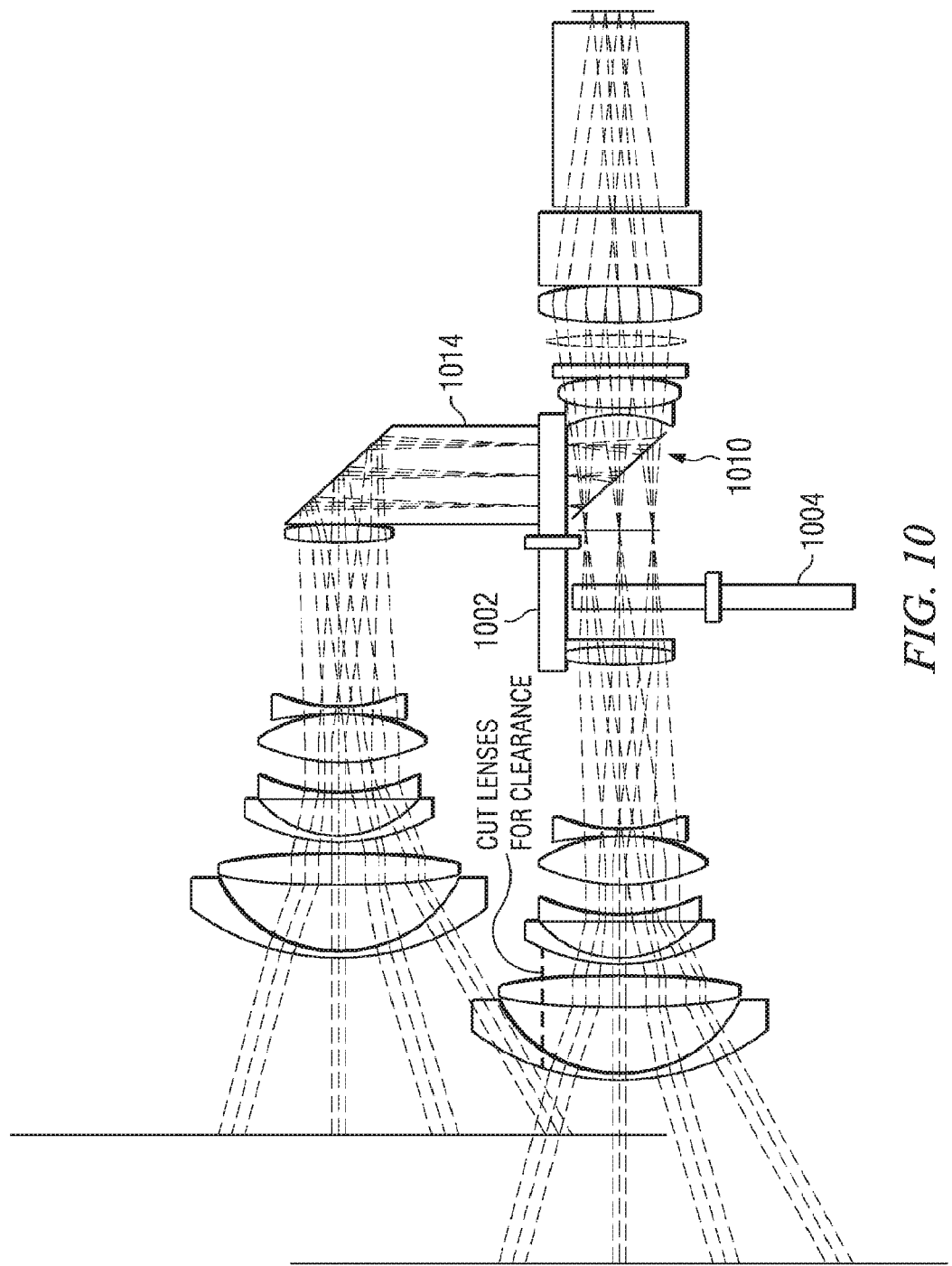
FIG. 10 is a schematic diagram illustrating an eighth embodiment of a PCS, in accordance with the present disclosure.

Eighth Embodiment:

FIG. 10 depicts a similar polarization conversion system 1000 to that of FIG. 9. In this exemplary embodiment, the structure and function of the components of the PCS 1000 are substantially similar to that of the PCS 900, except two rotator wheels 1002 and 1004 are implemented instead of one, in part, to ease packaging constraints near the prism 808. The rotator wheels 1002 and 1004 may operate in synchronization with each other.

Figure 11:
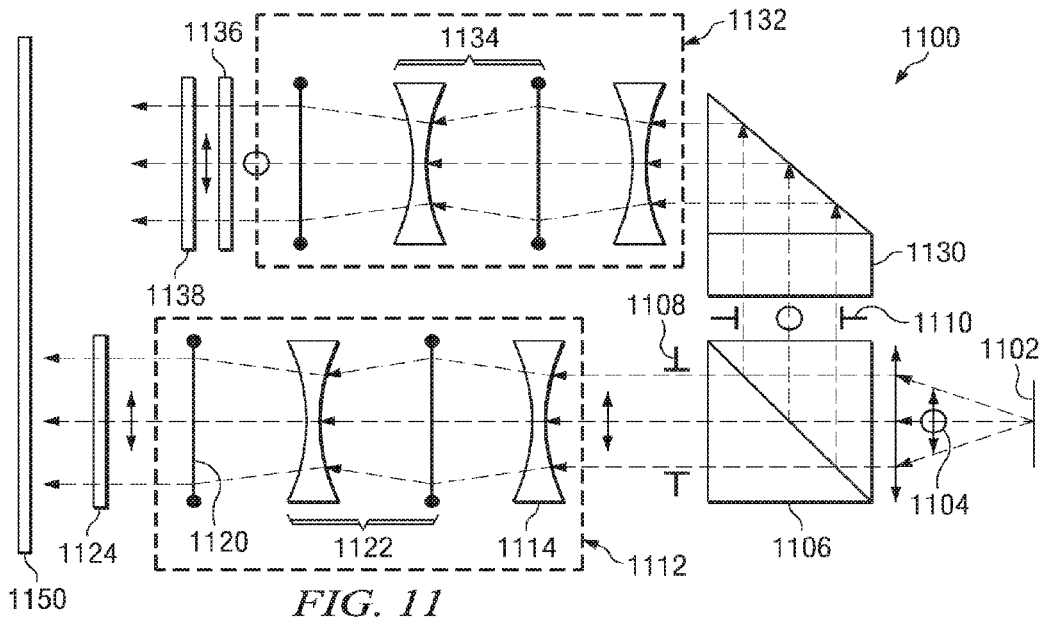
FIG. 11 is a schematic diagram of a ninth embodiment of a PCS, in accordance with the present disclosure.

Ninth Embodiment:

FIG. 11 is a schematic diagram of an exemplary cinematic PCS system 1100 that implements zoom lenses. Cinematic PCS system 1100 may include a panel 1102, a telecentric objective 1104 (i.e., an initial relay lens), a polarization beam splitter (PBS) 1106, first and second aperture stops 1108, 1110, first and second mechanically compensated afocal zooms 1112, 1132, reflecting element 1130, rotator 1136, and first and second z-screens 1124, 1138.

In operation, s- and p-polarized light from panel 1102 passes through telecentric objective 1104 toward PBS 1106. Telecentric objective 1104 is used to maintain collimated light at the PBS 1106 for all zoom settings. PBS 1106 may be a cube or wire grid plate, or any other PBS known in the art. In this embodiment, p-polarized light is transmitted through the PBS 1106 toward a first direction, while s-polarized light is reflected at the PBS 1106 toward a second direction.

The p-polarized light passes through aperture stop 1108 toward a first mechanically compensated afocal zoom apparatus 1112. Zoom 1112 may include various elements having positive and negative optical powers. The afocal zoom can be mechanically compensated or optically compensated, for instance, using techniques in zoom lens design from "Modern Optical Engineering" by Warren Smith, 1990, McGraw-Hill, herein incorporated by reference. Zoom 1112 in this exemplary embodiment may have, on a light path, a fixed optical element such as concave lens 1114, followed by moving elements convex lens 1116 and concave lens 1118, followed by another fixed element, convex lens 1120. Generally in FIG. 11, convex lenses are represented by lines with dots at either end, and generally have positive optical power and may include single or multiple optical elements to provide such positive optical power. Conversely, concave lenses (represented by concave graphics) generally have negative optical power and may include single or multiple optical elements to provide such negative optical power. The moving elements 1122 may move along the optical axis to adjust the zoom of the image as desired. Light from zoom 1112 then passes through a first z-screen 1124 and then toward a screen 1150 to form a first image.

S-polarized light from PBS 1106 that is reflected toward the second direction passes through aperture stop 1110. Subsequently, the light is reflected by about 90 degrees by a reflecting element 1130, such as a right angle prism with mirror 1130. the s-polarized light then passes through second mechanically compensate afocal zoom 1132. Zoom 1132 may employ a similar structure and operate in a similar way to the structure and operation described for zoom 1112. Of course, the moving elements 1134 may be adjusted differently, to provide a different zoom, as desired. S-polarized light from zoom 1132 may then pass through rotator 1136, which may be an achromatic half wave plate. Rotator 1136 functions to rotate the s-polarized light into p-polarized light. The p-polarized light on the second light path then passes through second z-screen 1138, and then toward screen 1150, to form a second image. The first and second images are overlaid at screen 1150.

The following discussion relates to further embodiments, components used in the disclosed embodiments, and variations of embodiments disclosed herein.

Polarizing beam splitter: The exemplary PBS shown in FIG. 3 through FIG. 12 is depicted as a PBS plate. This PBS plate may be constructed using a wire grid layer on glass (e.g. Proflux polarizer from Moxtek in Orem, Utah, polarization recycling film (e.g., Double Brightness Enhancing Film from 3M in St. Paul, Minn.), polarization recycling film on glass (for flatness), or a multi-dielectric layer on glass. The PBS could also be implemented as a glass cube (with wire grid, polarization recycling film, or dielectric layers along the diagonal).

Adjustment of image location: In FIG. 3, the primary adjustment of image location for each path is lateral displacement of the projection lenses 328 and 330. Additional adjustment of the image location may be achieved by adjusting the PBS 310 and/or the mirror 318. In FIG. 4 and FIG. 5, the primary adjustment of the image location for each path is the lateral displacement of the projection lenses 428/430 and 528/530. Additional fine adjustment of the image location may be achieved by laterally displacing and tilting the prism structure 402. In FIG. 6 and FIG. 7, adjustment of the image overlay can be achieved by fine adjustment of the prism location and tilt. Adjustment of the image location on-screen may be accomplished by lateral displacement of the projection lens (630 or 730). In FIG. 8 through FIG. 10, adjustment of the image overlay may be accomplished by tilting the polarizing beam splitter (810, 910, or 1010) and/or tilting the prism (814, 914, or 1014). Adjustment of the aforementioned components (PBS, Mirror and/or projection lenses) to control image location may be accomplished using electro-mechanical actuators. Feedback control systems and sensors may provide processing, control and drive instructions to the actuators in order to position the location of the first and second images on the screen 102.

Polarization switch: The polarization switch, as illustrated in disclosed embodiments, may be a circular polarization switch or a linear polarization switch (e.g., Z-screen of U.S. Pat. No. 4,792,850 to Lipton, or one of the Achromatic Polarization Switches as disclosed in U.S. patent application Ser. No. 11/424,087, all of which are previously y incorporated by reference). Another technique disclosed herein for switching polarization includes using a rotating polarization wheel, as shown in the embodiments taught with reference to FIGS. 5, 7, 9 and 10. For that matter, the polarization switch 312 can be any switch that alternates between orthogonal polarization states, such that the eyewear 104 can decode the states and send the appropriate imagery to each eye. The polarization switch can be split between the two paths (e.g. to increase yield of the device).

Transmission and stray light control: All transmissive elements may be anti-reflection coated to provide high transmission and low reflection. Reflections from transmissive elements can cause stray light in the system, which degraded contrast and/or produces disturbing artifacts in the final image. Non-optical surface (e.g., the prism sides) can be painted black to enhance contrast. Additional absorptive polarizers may be placed after the PBS 310 in either path to control polarization leakage and improve the final image contrast.

Fold mirror and polarization purity: The fold mirror may be replaced with a PBS element (e.g., wire grid plate) in FIG. 3 through FIG. 10. In this case, a purer polarization may be maintained after the folding element and could negate the need for an input polarizer on the polarization switch. Additionally, light reflected at the angled face of the prism may use total internal reflection for the reflecting mechanism. Dielectric and metal layers may also be added to the prism at the angled face to enhance reflection and preserve polarization purity.

Figure 12:
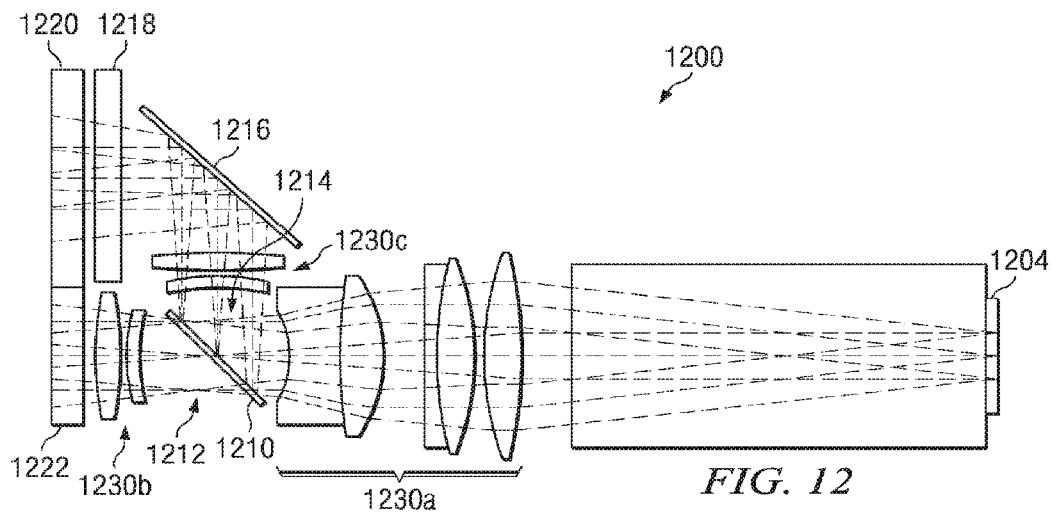
FIG. 12 is a schematic diagram of a tenth embodiment of a PCS, in accordance with the present disclosure.

Projection Lenses: Although the embodiments of FIGS. 3-10 illustrate the use of projection lenses with reverse telephoto construction, the polarization conversion systems disclosed herein are not limited to using such projection lenses. A reverse telephoto lens in a compact form is described in U.S. Pat. No. 6,473,242 ('242 patent), which is hereby incorporated by reference. For instance, FIG. 12 illustrates a tenth embodiment of the polarization conversion system 1200 that provides a polarization beam splitter internal to the projection lens, differing from the reverse telephoto lens design of the '242 patent. In this embodiment, the polarizing beam splitter 1210 is incorporated into the lens (1230a, 1230b and 1230c) at the aperture stop, and two optical paths 1212 and 1214 exist for overlaying the two polarization states out of the projector. In this example, the mirror 1216, rotator 1218 and polarization switches 1220 and 1222 are located after the second half of the projection lens (1230b and 1230c), between the lens 1230 and silver screen. The lens proscription has been modified to produce collimated rays from each field point at the aperture stop. This modification results two particular differences from the lens described in the '242 patent. First, whereas the lens of the '242 patent satisfies the conciliation "0.18<r4/f<0.45," the lens described herein has no restriction on r4 (e.g., r4/f could be a 0.6 in this instance). Second, whereas the lens of the '242 patent includes a "third lens group having a positive refraction power," the lens described herein may include a third lens having negative refractive power. As a consequence of the modification, the lens described herein is no longer reverse telephoto. A PBS 1210, mirror 1216, and polarization switch(es) 1220, 1222 are included for the PCS function. The mirror 1216 can be tilted to align the two images at the screen. In some embodiments, a right-angle glass prism may substitute the mirror 1216. In some embodiments, the PBS 1210 can be replaced with a PBS cube. In the diagram, the polarization switches are placed at the output of the lens for highest polarization purity. One or two polarization switches may be used at the output. One path may include an achromatic rotator prior to the switch.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organization cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth therein.

What is claimed is:

1. A polarization conversion system for transmitting polarization encoded imagery to a projection screen, comprising:
    a polarization beam splitter operable to receive image light from an image source, operable to transmit image light of a first polarization state toward a first image light path, and operable to reflect image light of a second polarization state toward a second image light path;
    a first polarization switch located on at least one of the first image light path and the second image light path, the polarization switch operable to selectively alternate the polarization of image light passing therethrough between a first output state of polarization and a second output state of polarization so that the image light passing therethrough has sequentially alternating polarizations;
    a first projection lens located on the first image light path, wherein the first projection lens is operable to project the image light of the first image light path onto the projection screen as a first diverging light beam between the first projection lens and the projection screen;
    a second projection lens located on the second image light path, wherein the second projection lens is operable to project the image light of the second path image light onto the projection screen as a second diverging light beam between the second projection lens and the projection screen;
    wherein the first and second projection lenses are further operable to direct the first diverging light beam and the second diverging light beam to superimpose and substantially overlap with each other on the projection screen;
    wherein the polarization conversion system is positioned between the image source and the projection screen; and
    wherein the first polarization switch operates such that the first and second diverging light beams have the same state of polarization as they simultaneously reach the projection screen.

2. The polarization conversion system of claim 1, wherein the image light received at polarization beam splitter is randomly polarized light.

3. The polarization conversion system of claim 1, wherein of the light received at the polarization beam splitter is imaged at the projection screen with a single polarization state.

4. The polarization conversion system of claim 1, further comprising a reflector positioned on the second image light path, wherein the reflector is operable with the second projection lens to direct the second image light from the second image light path to be superimposed on and substantially overlap on the projection screen with the first image light from the first image light path.

5. The polarization conversion system of claim 4, wherein the reflector is a mirror.

6. The polarization conversion system of claim 4, wherein the reflector is a prism.

7. The polarization conversion system of claim 1, further comprising a relay lens located optically after the first polarization switch.

8. The polarization conversion system of claim 1, further comprising a polarization rotator located optically before the first polarization switch.

9. The polarization conversion system of claim 8, wherein the polarization rotator is a half-wave plate.

10. The polarization conversion system of claim 8, wherein the polarization rotator is optically adjacent to the first polarization switch.

11. The polarization conversion system of claim 1, further comprising a second polarization switch located on the other of the first image light path and the second image light path relative to the first polarization switch.

12. The polarization conversion system of claim 11, further comprising a relay lens located optically after the second polarization switch.

13. The polarization conversion system of claim 11, further comprising a polarization rotator located optically before the second polarization switch.

14. The polarization conversion system of claim 13, wherein the polarization rotator is a half-wave plate.

15. The polarization conversion system of claim 13, wherein the polarization rotator is optically adjacent to the second polarization switch.

16. The polarization conversion system of claim 1, wherein the first polarization switch is located optically before the first or the second projection lens on the respective first or second image light path.

17. The polarization conversion system of claim 1, wherein the first polarization switch is located optically after the first or the second projection lens on the respective first or second image light path.

18. The polarization conversion system of claim 11, wherein the second polarization switch is located optically before the first or the second projection lens on the respective first or second image light path.

19. The polarization conversion system of claim 11, wherein the second polarization switch is located optically after the first or the second projection lens on the respective first or second image light path.

20. The polarization conversion system of claim 1, further comprising a prism positioned on the second image light path, wherein the prism is operable with the second projection lens to direct the second image light from the second image light path to be superimposed on and substantially overlap on the projection screen with the first image light from the first image light path.

21. The polarization conversion system of claim 20, wherein the prism is a glass prism.

22. The polarization conversion system of claim 20, wherein the prism comprises an angled surface that optically operates as a fold mirror.

23. The polarization conversion system of claim 22, wherein the angled surface operates to reflect the image light striking it through total internal reflection.

24. The polarization conversion system of claim 22, wherein the angled surface is coated with a mirror layer.

25. The polarization conversion system of claim 24, wherein the coated mirror layer comprises silver.

26. The polarization conversion system of claim 20, further comprising an aperture stop optically before the prism.

27. The polarization conversion system of claim 20 wherein the prism is operable to be tilted in order to facilitate the directing of the first diverging light beam and the second diverging light beam to superimpose and substantially overlap with each other on the projection screen.

28. The polarization conversion system of claim 1 wherein the polarizing beam splitter is operable to be tilted in order to facilitate the directing of the first diverging light beam and the second diverging light beam to superimpose and substantially overlap with each other on the projection screen.

29. The polarization conversion system of claim 1 wherein the projection lenses are operable to be laterally displaced from the light path in order to facilitate the directing of the first diverging light beam and the second diverging light beam to superimpose and substantially overlap with each other on the projection screen.

30. The polarization conversion system of claim 1, wherein the first polarization switch operates such that the first and second diverging light beams have the same states of polarization as they simultaneously reach the projection screen, and wherein the states of polarization alternative between horizontal and vertical linear polarization.

31. The polarization conversion system of claim 1, wherein the first polarization switch operates such that the first and second diverging light beams have the same states of polarization as they simultaneously reach the projection screen, and wherein the states of polarization alternative between left- and right-handed circular polarization.

32. A polarization conversion system for transmitting polarization encoded imagery to a projection screen, comprising:
   a polarization beam splitter operable to receive image light from an image source, operable to transmit image light of a first polarization state toward a first image light path, and operable to reflect image light of a second polarization state toward a second image light path;
   a first polarization switch located on at least one of the first image light path and the second image light path, the polarization switch operable to selectively alternate the polarization of image light passing therethrough between a first output state of polarization and a second output state of polarization so that the image light passing therethrough has sequentially alternating polarizations;
   a first projection lens located on the first image light path, wherein the first projection lens is operable to project the image light of the first image light path onto the projection screen as a first diverging light beam between the first projection lens and the projection screen;
   a second projection lens located on the second image light path, wherein the second projection lens is operable to project the image light of the second path image light onto the projection screen as a second diverging light beam between the second projection lens and the projection screen; and
   a reflector positioned on the second image light path, wherein the reflector is operable with the second projection lens to direct the second image light from the second image light path to be superimposed on and substantially overlap on the projection screen with the first image light from the first image light path;
   wherein the image light received at polarization beam splitter is randomly polarized light;
   wherein the first and second projection lenses are further operable to direct the first diverging light beam and the second diverging light beam to superimpose and substantially overlap with each other on the projection screen;

wherein the polarization conversion system is positioned between the image source and the projection screen;

wherein the first polarization switch operates such that the first and second diverging light beams have the same state of polarization as they simultaneously reach the projection screen; and wherein of the light received at the polarization beam splitter is imaged at the projection screen with a single polarization state.

33. The polarization conversion system of claim 32, wherein the reflector is a mirror.

34. The polarization conversion system of claim 32, wherein the reflector is a prism.

35. The polarization conversion system of claim 32, further comprising a polarization rotator located optically before the first polarization switch.

36. The polarization conversion system of claim 32, wherein the polarization rotator is a half-wave plate.

37. The polarization conversion system of claim 32, wherein the polarization rotator is optically adjacent to the first polarization switch.

38. The polarization conversion system of claim 32, further comprising a second polarization switch located on the other of the first image light path and the second image light path relative to the first polarization switch.

39. The polarization conversion system of claim 38, further comprising a polarization rotator located optically before the second polarization switch.

40. The polarization conversion system of claim 38, wherein the polarization rotator is a half-wave plate.

41. The polarization conversion system of claim 38, wherein the polarization rotator is optically adjacent to the second polarization switch.

42. The polarization conversion system of claim 32, wherein the first polarization switch is located optically before the first or the second projection lens on the respective first or second image light path or after the first or the second projection lens on the respective first or second image light path.

43. The polarization conversion system of claim 38, wherein the second polarization switch is located optically before the first or the second projection lens on the respective first or second image light path.

44. The polarization conversion system of claim 38, wherein the second polarization switch is located optically after the first or the second projection lens on the respective first or second image light path.

45. The polarization conversion system of claim 32, further comprising a prism positioned on the second image light path, wherein the prism is operable with the second projection lens to direct the second image light from the second image light path to be superimposed on and substantially overlap on the projection screen with the first image light from the first image light path.

46. The polarization conversion system of claim 45, further comprising an aperture stop optically before the prism.

47. The polarization conversion system of claim 45, wherein the prism is operable to be tilted in order to facilitate the directing of the first diverging light beam and the second diverging light beam to superimpose and substantially overlap with each other on the projection screen.

48. The polarization conversion system of claim 32, wherein the first polarization switch operates such that the first and second diverging light beams have the same states of polarization as they simultaneously reach the projection screen, and wherein the states of polarization alternative between horizontal and vertical linear polarization.

49. A polarization conversion system for transmitting polarization encoded imagery to a projection screen, comprising:

a polarization beam splitter operable to receive image light from an image source, operable to transmit image light of a first polarization state toward a first image light path, and operable to reflect image light of a second polarization state toward a second image light path;

a first polarization switch located on at least one of the first image light path and the second image light path, the polarization switch operable to selectively alternate the polarization of image light passing therethrough between a first output state of polarization and a second output state of polarization so that the image light passing therethrough has sequentially alternating polarizations;

a first projection lens located on the first image light path, wherein the first projection lens is operable to project the image light of the first image light path onto the projection screen as a first diverging light beam between the first projection lens and the projection screen;

a second projection lens located on the second image light path, wherein the second projection lens is operable to project the image light of the second path image light onto the projection screen as a second diverging light beam between the second projection lens and the projection screen; and a polarization rotator located optically before the first polarization switch;

wherein the image light received at polarization beam splitter is randomly polarized light, wherein the first and second projection lenses are further operable to direct the first diverging light beam and the second diverging light beam to superimpose and substantially overlap with each other on the projection screen;

wherein the polarization conversion system is positioned between the image source and the projection screen;

wherein the first polarization switch operates such that the first and second diverging light beams have the same state of polarization as they simultaneously reach the projection screen; and wherein of the light received at the polarization beam splitter is imaged at the projection screen with a single polarization state.

50. The polarization conversion system of claim 49, wherein the polarization rotator is a half-wave plate.

51. The polarization conversion system of claim 49, wherein the polarization rotator is optically adjacent to the first polarization switch.

52. The polarization conversion system of claim 49, further comprising a reflector positioned on the second image light path, wherein the reflector is operable with the second projection lens to direct the second image light from the second image light path to be superimposed on and substantially overlap on the projection screen with the first image light from the first image light path.

53. The polarization conversion system of claim 52, wherein the reflector is a mirror.

54. The polarization conversion system of claim 52, wherein the reflector is a prism.

55. The polarization conversion system of claim 49, wherein the first polarization switch is located optically before the first or the second projection lens on the respective first or second image light path or after the first or the second projection lens on the respective first or second image light path.

56. The polarization conversion system of claim 49, further comprising a prism positioned on the second image light path, wherein the prism is operable with the second projection lens to direct the second image light from the second image light path to be superimposed on and substantially overlap on the projection screen with the first image light from the first image light path.

57. A polarization conversion system for transmitting polarization encoded imagery to a projection screen, comprising:
   a polarization beam splitter operable to receive image light from an image source, operable to transmit image light of a first polarization state toward a first image light path, and operable to reflect image light of a second polarization state toward a second image light path;
   a first polarization switch located on at least one of the first image light path and the second image light path, the polarization switch operable to selectively alternate the polarization of image light passing therethrough between a first output state of polarization and a second output state of polarization so that the image light passing therethrough has sequentially alternating polarizations;
   a first projection lens located on the first image light path, wherein the first projection lens is operable to project the image light of the first image light path onto the projection screen as a first diverging light beam between the first projection lens and the projection screen;
   a second projection lens located on the second image light path, wherein the second projection lens is operable to project the image light of the second path image light onto the projection screen as a second diverging light beam between the second projection lens and the projection screen;
   a polarization rotator located optically before the first polarization switch;
   a reflector positioned on the second image light path, wherein the reflector is operable with the second projection lens to direct the second image light from the second image light path to be superimposed on and substantially overlap on the projection screen with the first image light from the first image light path;
   wherein the image light received at polarization beam splitter is randomly polarized light;
   wherein the first and second projection lenses are further operable to direct the first diverging light beam and the second diverging light beam to superimpose and substantially overlap with each other on the projection screen;
   wherein the polarization conversion system is positioned between the image source and the projection screen;
   wherein the first polarization switch operates such that the first and second diverging light beams have the same state of polarization as they simultaneously reach the projection screen; and
   wherein of the light received at the polarization beam splitter is imaged at the projection screen with a single polarization state.

58. The polarization conversion system of claim 57, wherein the reflector is a mirror.

59. The polarization conversion system of claim 57, wherein the reflector is a prism.

60. The polarization conversion system of claim 57, wherein the polarization rotator is a half-wave plate.

61. The polarization conversion system of claim 57, wherein the polarization rotator is optically adjacent to the first polarization switch.

62. The polarization conversion system of claim 57, further comprising a second polarization switch located on the other of the first image light path and the second image light path relative to the first polarization switch.

63. The polarization conversion system of claim 62, wherein the first polarization switch is located optically before the first or the second projection lens on the respective first or second image light path or after the first or the second projection lens on the respective first or second image light path.

64. The polarization conversion system of claim 62, wherein the second polarization switch is located optically before the first or the second projection lens on the respective first or second image light path or after the first or the second projection lens on the respective first or second image light path.

65. The polarization conversion system of claim 57, further comprising a prism positioned on the second image light path, wherein the prism is operable with the second projection lens to direct the second image light from the second image light path to be superimposed on and substantially overlap on the projection screen with the first image light from the first image light path.

66. The polarization conversion system of claim 65, further comprising an aperture stop optically before the prism.

67. The polarization conversion system of claim 57, wherein the polarizing beam splitter is operable to be tilted in order to facilitate the directing of the first diverging light beam and the second diverging light beam to superimpose and substantially overlap with each other on the projection screen.

68. The polarization conversion system of claim 57, wherein the projection lenses are operable to be laterally displaced from the light path in order to facilitate the directing of the first diverging light beam and the second diverging light beam to superimpose and substantially overlap with each other on the projection screen.

69. The polarization conversion system of claim 57, wherein the first polarization switch operates such that the first and second diverging light beams have the same states of polarization as they simultaneously reach the projection screen, and wherein the states of polarization alternative between horizontal and vertical linear polarization.

70. The polarization conversion system of claim 57, wherein the first polarization switch operates such that the first and second diverging light beams have the same states of polarization as they simultaneously reach the projection screen, and wherein the states of polarization alternative between left- and right-handed circular polarization.

71. A polarization conversion system for transmitting polarization encoded imagery to a projection screen, comprising:
   a polarization beam splitter operable to receive image light from an image source, operable to transmit image light of a first polarization state toward a first image light path, and operable to reflect image light of a second polarization state toward a second image light path;

a first polarization switch located on at least one of the first image light path and the second image light path, the polarization switch operable to selectively alternate the polarization of image light passing therethrough between a first output state of polarization and a second output state of polarization so that the image light passing therethrough has sequentially alternating polarizations;

a first projection lens located on the first image light path, wherein the first projection lens is operable to project the image light of the first image light path onto the projection screen as a first diverging light beam between the first projection lens and the projection screen;

a second projection lens located on the second image light path, wherein the second projection lens is operable to project the image light of the second path image light onto the projection screen as a second diverging light beam between the second projection lens and the projection screen;

a second polarization switch located on the other of the first image light path and the second image light path relative to the first polarization switch;

a polarization rotator located optically before the second polarization switch; and wherein the image light received at polarization beam splitter is randomly polarized light;

wherein the first and second projection lenses are further operable to direct the first diverging light beam and the second diverging light beam to superimpose and substantially overlap with each other on the projection screen;

wherein the polarization conversion system is positioned between the image source and the projection screen;

wherein the first polarization switch operates such that the first and second diverging light beams have the same state of polarization as they simultaneously reach the projection screen; and wherein of the light received at the polarization beam splitter is imaged at the projection screen with a single polarization state.

72. The polarization conversion system of claim 71, further comprising a reflector positioned on the second image light path, wherein the reflector is operable with the second projection lens to direct the second image light from the second image light path to be superimposed on and substantially overlap on the projection screen with the first image light from the first image light path.

73. The polarization conversion system of claim 72, wherein the reflector is a mirror.

74. The polarization conversion system of claim 72, wherein the reflector is a prism.

75. The polarization conversion system of claim 71, wherein the polarization rotator is a half-wave plate.

76. The polarization conversion system of claim 71, wherein the polarization rotator is optically adjacent to the second polarization switch.

77. The polarization conversion system of claim 71, wherein the first polarization switch is located optically before the first or the second projection lens on the respective first or second image light path or after the first or the second projection lens on the respective first or second image light path.

78. The polarization conversion system of claim 71, wherein the second polarization switch is located optically before the first or the second projection lens on the respective first or second image light path or after the first or the second projection lens on the respective first or second image light path.

79. The polarization conversion system of claim 71, further comprising a prism positioned on the second image light path, wherein the prism is operable with the second projection lens to direct the second image light from the second image light path to be superimposed on and substantially overlap on the projection screen with the first image light from the first image light path.

80. The polarization conversion system of claim 71, wherein the first polarization switch operates such that the first and second diverging light beams have the same states of polarization as they simultaneously reach the projection screen, and wherein the states of polarization alternative between horizontal and vertical linear polarization.

81. The polarization conversion system of claim 71, wherein the first polarization switch operates such that the first and second diverging light beams have the same states of polarization as they simultaneously reach the projection screen, and wherein the states of polarization alternative between left- and right-handed circular polarization.

* * * * *